(12) United States Patent
Deishi

(10) Patent No.: US 8,958,435 B2
(45) Date of Patent: Feb. 17, 2015

(54) INFORMATION MANAGEMENT METHOD AND INFORMATION PROCESSING DEVICE

(75) Inventor: Satoshi Deishi, Ibaraki (JP)

(73) Assignee: Konica Minolta Holdings, Inc., Tokyo (JP)

( * ) Notice: Subject to any disclaimer, the term of this patent is extended or adjusted under 35 U.S.C. 154(b) by 702 days.

(21) Appl. No.: 12/447,982

(22) PCT Filed: Oct. 5, 2007

(86) PCT No.: PCT/JP2007/069576
§ 371 (c)(1),
(2), (4) Date: Apr. 30, 2009

(87) PCT Pub. No.: WO2008/056496
PCT Pub. Date: May 15, 2008

(65) Prior Publication Data
US 2010/0067369 A1 Mar. 18, 2010

(30) Foreign Application Priority Data
Nov. 9, 2006 (JP) .................................. 2006-303834

(51) Int. Cl.
*H04L 12/26* (2006.01)
*H04L 29/08* (2006.01)
*G06F 21/62* (2013.01)
*G06Q 10/06* (2012.01)
*H04L 29/06* (2006.01)

(52) U.S. Cl.
CPC .............. *H04L 67/104* (2013.01); *G06F 21/62* (2013.01); *G06Q 10/06* (2013.01); *H04L 63/20* (2013.01); *G06F 2221/2137* (2013.01); *G06F 2221/2143* (2013.01)
USPC ........... 370/428; 370/419; 370/420; 370/422; 370/235

(58) Field of Classification Search
CPC ...... H04L 43/04; H04L 41/0823; H04L 41/12
USPC ......... 370/428, 216, 400, 422, 429, 412, 419, 370/420, 235, 252; 707/9, 10; 711/160
See application file for complete search history.

(56) References Cited

U.S. PATENT DOCUMENTS 5,675,509 A * 10/1997 Ikami et al. .................... 370/536
7,139,745 B2 * 11/2006 Nakamura et al. .................... 1/1

(Continued)

FOREIGN PATENT DOCUMENTS

| JP | 2004-252732 A | 9/2004 |
| JP | 2005-275937 A | 10/2005 |
| WO | WO 2008/056496 A1 | 5/2008 |

OTHER PUBLICATIONS

Hirota Nobuyuki et al., "A File Cache Protocol for Mild Wide Distributed File Systems", Information Processing Society of Japan Kenkyu Hokoku, Mar. 19, 1993, vol. 93, No. 27, pp. 1-8; together with a partial English-language translation.

*Primary Examiner* — Jamal Javaid
(74) *Attorney, Agent, or Firm* — Buchanan Ingersoll & Rooney PC

(57) ABSTRACT

An information management method and an information processing device functioning as a node are provided to enable an effective use of information distributed to, and shared with, a plurality of nodes on a network and to enable maintenance of security against leakage of information by controlling information retention. This management method of information gathers information distributed to, and shared with, a plurality of the nodes on a network and holds the information in a state accessible from other nodes to a temporary information memory unit when generating restored information. The information management method is also characterized in setting a flag for showing a history of the information and immediately discarding the information in the case that the retention of restored information becomes improper from a view point of contents of the flag.

14 Claims, 17 Drawing Sheets

(56) References Cited

U.S. PATENT DOCUMENTS

| | | | |
|---|---|---|---|
| 2002/0059309 A1* | 5/2002 | Loy et al. | 707/200 |
| 2004/0236746 A1* | 11/2004 | Lomet | 707/9 |
| 2005/0216473 A1* | 9/2005 | Aoyagi et al. | 707/10 |
| 2006/0271601 A1* | 11/2006 | Fatula et al. | 707/201 |
| 2007/0113031 A1* | 5/2007 | Brown et al. | 711/160 |

* cited by examiner

| HOST NAME | IP ADDRESS | MAC ADDRESS |
|---|---|---|
| PC2 | 192.168.0.112 | 00-11-22-33-44-02 |
| PC9 | 192.168.0.119 | 00-11-22-33-44-09 |

TL2(TL)

| HOST NAME | IP ADDRESS | MAC ADDRESS |
|---|---|---|
| PC1 | 192.168.0.111 | 00-11-22-33-44-01 |
| PC3 | 192.168.0.113 | 00-11-22-33-44-03 |
| PC4 | 192.168.0.114 | 00-11-22-33-44-04 |
| PC7 | 192.168.0.117 | 00-11-22-33-44-07 |

TL6(TL)

| HOST NAME | IP ADDRESS | MAC ADDRESS |
|---|---|---|
| PC3 | 192.168.0.113 | 00-11-22-33-44-03 |
| PC5 | 192.168.0.115 | 00-11-22-33-44-05 |
| PC7 | 192.168.0.117 | 00-11-22-33-44-07 |
| PC8 | 192.168.0.118 | 00-11-22-33-44-08 |

TL7(TL)

| HOST NAME | IP ADDRESS | MAC ADDRESS |
|---|---|---|
| PC2 | 192.168.0.112 | 00-11-22-33-44-02 |
| PC6 | 192.168.0.116 | 00-11-22-33-44-06 |
| PC8 | 192.168.0.118 | 00-11-22-33-44-08 |
| PC9 | 192.168.0.119 | 00-11-22-33-44-09 |

TL8(TL)

| HOST NAME | IP ADDRESS | MAC ADDRESS |
|---|---|---|
| PC6 | 192.168.0.116 | 00-11-22-33-44-06 |
| PC7 | 192.168.0.117 | 00-11-22-33-44-07 |
| PC9 | 192.168.0.119 | 00-11-22-33-44-09 |

TL9(TL)

| HOST NAME | IP ADDRESS | MAC ADDRESS |
|---|---|---|
| PC1 | 192.168.0.111 | 00-11-22-33-44-01 |
| PC5 | 192.168.0.115 | 00-11-22-33-44-05 |
| PC7 | 192.168.0.117 | 00-11-22-33-44-07 |
| PC8 | 192.168.0.118 | 00-11-22-33-44-08 |

FIG. 19

| |
|---|
| FLAG |
| RESTORATION TIME |
| REFERENCE TIME |
| NUMBER OF TIMES OF READING-OUT OF INFORMATION STORED IN TEMPORARY INFORMATION STORAGE SECTION |
| NUMBER OF TIMES OF WRITTEN-IN IN INFORMATION STORED IN TEMPORARY INFORMATION STORAGE SECTION |
| CONFLICT OCCURRED IN REFERENCE TO INFORMATION STORED IN TEMPORARY INFORMATION STORAGE SECTION |
| OCCURRENCE OF SYSTEM FAILURE SUCH AS ERROR AND WARNING |
| OCCURRENCE OF INTERRUPTION OF SYSTEM POWER |

FIG. 20

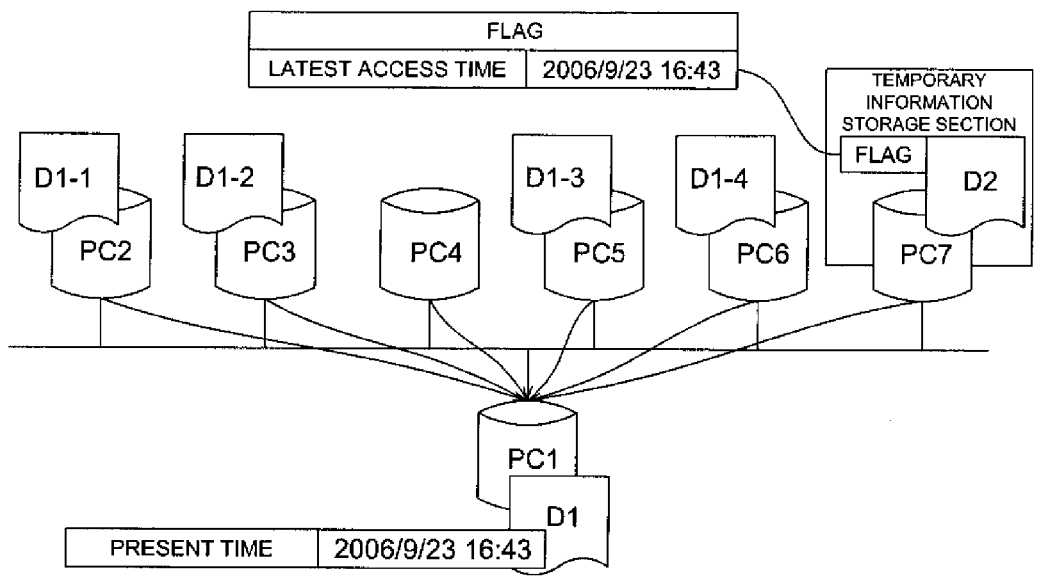

INFORMATION MANAGEMENT METHOD AND INFORMATION PROCESSING DEVICE

RELATED APPLICATIONS

This application is a National Stage of International Application No. PCT/JP2007/069576, filed with the Japanese Patent Office on Oct. 5, 2007, which is based on Japanese Patent Application No. 2006-303834.

TECHNICAL FIELD

The present invention relates to information management methods in the network in which divided information is distributed to and shared with a plurality of nodes, and relates to information processing devices functioning as a node constituting the network.

BACKGROUND ART

In recent years, a network, which has a communication form in which data are freely transmitted and received among arbitrary nodes that constitute the network, has come to be used actively.

Conventionally, a centralized processing type network that includes a server, which functions as a host and is positioned in the center, and terminals, each of which acts as a client individually accessing the host server, was mainly used. Therefore, in the case where the terminals needed to communicate with each other, the communication is performed via the host server.

Meanwhile, a so-called distributed processing type network is gradually appearing. In order to realize a mechanism that distributes stored information or distributes process of the information, the communication function must also be distributed. Namely, data communications must be freely performed between each node that constitutes the network.

As a typical form, there is a form of a communication network called P2P (Peer to Peer). P2P is a form of use of the network in which the information is directly exchanged among a large unspecified number of nodes. There are two kinds of P2P. They are P2P that technically requires mediation of a central server and P2P that carries data in a bucket brigade type.

Also in the case where a central server is required, the central server only provides a file search database and performs connection management of the nodes. The exchange of data itself is performed by the direct connection between the concerned nodes.

A technology to efficiently realize a distributed-processing network form mentioned above has been studied (refer to patent documents 1 and 2). In both patent documents 1 and 2, the P2P system is used. Further, in Patent documents 1 and 2, there is formed a system in which the data are distributed to and shared with arbitrary nodes and the transmission and reception of data is performed.

Thereby, the flexibility as a usage form of the network system has improved, and users have gained a large convenience. However, on the other hand, since processing capability has to be distributed among the nodes, there may be a case where the distribution of the processing capability can be seen as a burden from the viewpoint of efficiency.

For example, in the case where data are distributed, a user is able to share a larger amount of data as the network scale becomes larger. However, in the conventional way, the user cannot acquire data only by accessing a specific server. It is also necessary to collect the required data distributed from a large network and restore the data in a required form.

It will be important from now how to reduce the burden accompanying such distributed processing.

Patent document 1: Unexamined Japanese Patent Application Publication No. 2005-275937
Patent document 2: Unexamined Japanese Patent Application Publication No. 2004-252732

DISCLOSURE OF THE INVENTION

Object of the Invention

In the system in which data can be distributed to and shared with a plurality of nodes just as the above-mentioned P2P network system, it was needed for a node to collect the necessary data distributed to a large network every time and restore the data into a suitable form. This restoration processing also requires a great cost (time, CPU power and network traffic).

An object of the present invention is to solve the above-mentioned problem and provide an information management method that is able to effectively use information divided, and distributed to and shared with a plurality of nodes on a network, and to provide an information processing device functioning as a node.

Means for Solving the Object

In order to solve the above-mentioned problems, the present invention has the following features.

1. An information management method in a network system in which divided information is distributed to and shared with a plurality of nodes, the method comprising:
an information restoration step for causing a first node to collect the divided information and generating information, which was before divided, as restored-information; and
a temporary storage step for storing the restored-information, generated in the information restoration step, in a temporary information storage section with a flag indicating a history of the restored-information, in a state that the restored-information is accessible by a second node different from the first node.

2. The information management method of Item 1, comprising:
an information discard step for causing the first node to reference the flag and discarding, based on a content of the flag, the restored-information which is stored in the temporary storage section in the temporary storage step.

3. The information management method of Item 1, comprising:
a restored-information obtaining step for causing the second node to access the first node and obtain the restored-information.

4. The information management method of Item 1, comprising:
a restored-information modifying step for, when the restored-information is modified, causing the first node to modify the flag and store the modified restored-information in the temporary storage section with the modified flag.

5. The information management method of Item 4, comprising:
a divided-information transmission step for causing the first node to divide the restored-information modified in the restored-information modifying step to be corresponding to the divided-information and transmit corresponding newly divided information to each node storing the divided-information which was divided before restored.

6. The information management method of Item 5, comprising:

an information discard step for causing the first node to reference the flag and discarding, based on a content of the flag, the restored-information which was stored in the temporary storage section in the temporary storage step, wherein when the restored-information has been modified in the restored-information modifying step, the divided-information transmission step is executed before the information discord step is executed.

7. The information management method of Item 2, wherein the content of the flag includes, about information stored in the temporary storage section, one or more of the followings: time at which the information was generated, time at which the information was referenced, a number of times the information was read out, a number of times the information was written, an occurrence of error when the information was referenced, an occurrence of a system failure, and an interruption of a system power; and the information discard step is executed when the content of the flag satisfies a predetermined condition.

8. An information processing device as a node in a network system in which divided information is distributed to and shared with a plurality of nodes, the information processing device comprising:

an information restoration section for collecting the divided information and generating information, which was before divided, as restored-information;

a temporary storage section for storing the restored-information generated by the information restoration section, with a flag indicating a history of the restored-information, in a state that the restored-information is accessible by the other nodes.

9. The information processing device of Item 8, comprising:

an information discard section for referencing the flag and discarding the restored-information stored in the temporary storage section based on a content of the flag.

10. The information processing device of Item 8, comprising:

a restored-information obtaining section for searching the other nodes for restored-information stored in the other node, wherein if the node storing the restored-information is found, the restored-information processing section accesses the found node and obtains the restored-information from the found node.

11. The information processing device of Item 8, comprising:

a restored-information modifying section for modifying the restored-information and the flag stored in the temporary storage section, and storing the modified restored-information and the modified flag instead of the restored-information.

12. The information processing device of Item 11, comprising:

a divided-information transmitting section for dividing the restored-information modified by the restored-information modifying section to be corresponding to the divided-information and transmitting each of the newly divided restored-information to each node so that the divided-information is replaced by each of the corresponding newly divided information.

13. The information processing device of Item 12, comprising:

an information discard section for referencing the flag and discarding the restored-information stored in the temporary storage section based on the content of the flag, wherein when the restored-information has been modified by the restored-information modifying section, the divided-information transmission section transmits the divided information before the information discard section discards the restored-information.

14. The information processing device of Item 9, wherein the content of the flag includes, about information stored in the temporary storage section, one or more of the followings: time at which the information was generated, time at which the information was referenced, a number of times the information was read out, a number of times the information was written, an occurrence of error when the information was referenced, an occurrence of a system failure, and an interruption of a system power; and the information discard section discards the information stored in the temporary storage section when the content of the flag satisfies a predetermined condition.

Effects of the Invention

In an information management method and an information processing device functioning as a node according to the present invention, when the divided information distributed to and shared with a plurality of nodes on a network is collected and restored into restored-information, the restored-information is stored in a temporary information storage section in such a manner that the other nodes can access the information, whereby each node can efficiently use the restored-information.

BRIEF DESCRIPTION OF THE DRAWINGS

FIG. 4 is a diagram illustrating an example of a connection table TL of the nodes 2 associated as shown in FIG. 3;

FIG. 19 illustrates an example of contents indicated by a flag.

FIG. 20 illustrates a state in which PC 1 searches PC2 to PC7 and acquires restored-data from PC7, which is the temporary storage node of the restored-data.

DESCRIPTION OF THE NUMERALS

1 NETWORK (P2P)
2 TERMINAL DEVICE (NODE)
2A Node Requesting Acquisition (of Restored-Data)
2B NODE STORING (DISTRIBUTED AND SHARED DATA)
2C NODE TEMPORARILY STORING (RESTORED-DATA)
3 SWITCHING HUB
4 ROUTER
5 AUTHENTICATION SERVER
201 CONNECTION TABLE HOLDING SECTION
202 CONNECTION TABLE MANAGEMENT SECTION
203 DATA HOLDING SECTION
204 DATA OPERATING SECTION
204a TEMPORARY INFORMATION STORAGE SECTION
204b OPERATION SECTION
205 AUTHENTICATION SECTION
206 NETWORK APPLICATION SECTION
207 DATA RECEIVING SECTION
208 DATA ANALYZING SECTION
209 DATA GENERATING SECTION
210 DATA TRANSMITTING SECTION
TL CONNECTION TABLE

BEST MODE FOR CARRYING OUT THE INVENTION

An embodiment according to the present invention will be described below with reference to the drawings.

(The Entire Configuration of Network)

Figure 1:
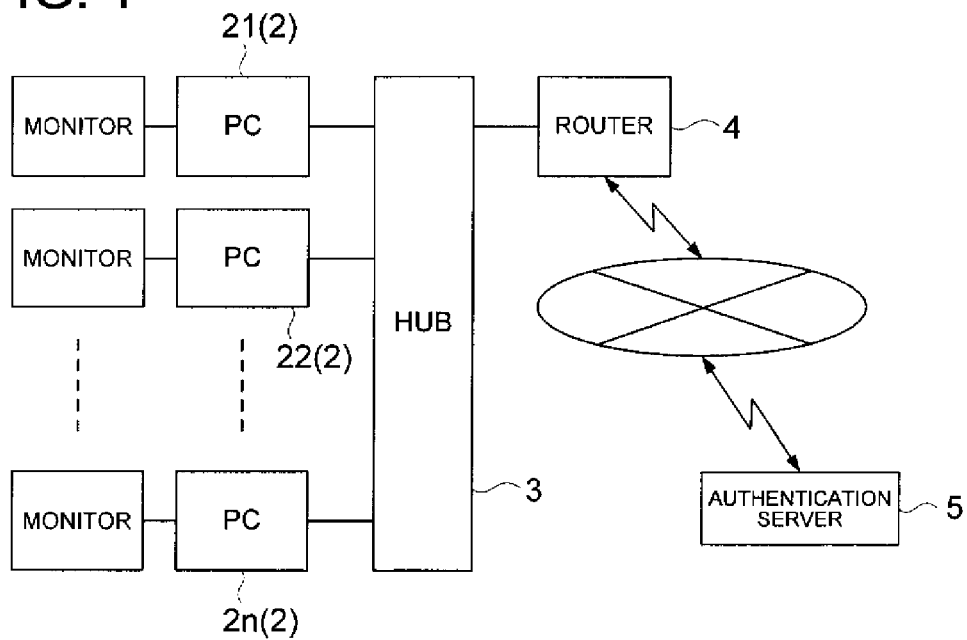
FIG. 1 is a diagram illustrating an example of the entire configuration of a network 1.

FIG. 1 illustrates an example of the general configuration of a network 1. The overall configuration of an embodiment of a network according to the present invention will be described with reference to FIG. 1.

The network 1 according to an embodiment of the present invention is LAN (Local Area Network) configured with nodes such as a plurality of terminal devices 2 (21, 22, - - -, 2n), a switching hub 3, a router 4 and an authentication server 5, as illustrated in FIG. 1. These terminal devices 2 are connected to the switching hub 3 in a star shape through a twisted-pair cable.

The terminal device 2 functioning as a node that constitutes the network is an information process apparatus. Further, the terminal device 2 is an apparatus that executes a process of input and output of data from and to another apparatus such as a personal computer, a workstation or a printer. Hereafter, a node is only referred to a terminal device of this type. Further, the embodiment will be described on a premise that a personal computer is used as the information process apparatus.

In this embodiment of the present invention, a configuration of a communication network called P2P (Peer to Peer) is used. P2P is a usage form of the network in which a large unspecified number of nodes directly exchanges information each other. There are two types of P2P. The two types are P2P that technically requires mediation of a central server and P2P that carries data in a bucket brigade manner.

Also in the case where a central server is required, the central server only provides a file search database and performs management of the connection between the nodes. The exchange of data itself is performed through direct connection between the nodes.

In this embodiment of the present invention, the nodes (terminal devices) 2 associated with each other in advance are directly connected and communicate with each other without using a central server. The connection topology of FIG. 3 will be described later. The node 2 is indirectly connected to the other nodes via a node directly connected with it. The authentication server 5 only performs a management of a certificate for authentication. The authentication server 5 does not directly participate in the connection for communication. The router 4 also does not directly participate in the communication between the nodes (terminal devices).

In P2P, in order for the nodes to directly communicate with each other, the security of how to authenticate mutual validity or how to control the chance for illegal access is important. Therefore, a digital certificate issued by the authentication server 5 is used. In an SSL communication, which will be mentioned later, the digital certificate of X.509 specification is used.

When the digital certificate is expired or the validity of the digital certificate is lost by loss or theft of the secret key, the certificate authority adds to a certificate revocation list (CRL: Certificate Revocation List) to disclose the fact.

Hereafter, description will be made from the above-mentioned viewpoint in the case where these nodes 2 perform mutual data communication, and restore and use the information distributed to and shared with the nodes in the network according to this embodiment of the present invention.

(Configuration of Terminal Device)

Figure 2:
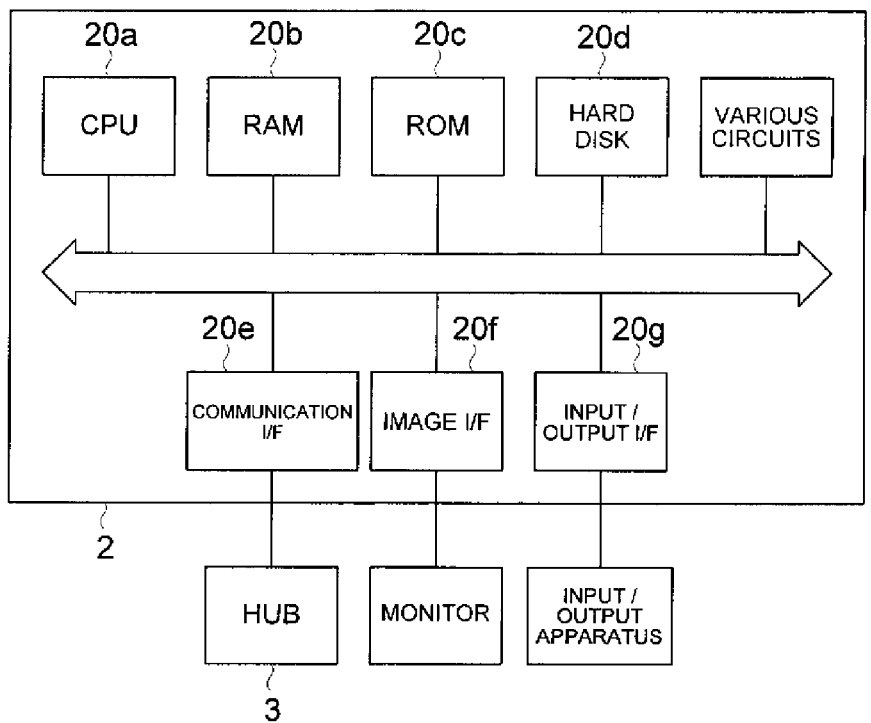
FIG. 2 is a diagram illustrating an example of a hardware configuration of a node (terminal device) 2 that constitutes the network 1.

FIG. 2 is a diagram illustrating an example of the hardware configuration of the node (terminal device) 2.

As illustrated in FIG. 2, the terminal device 2 is configured with a CPU 20a, a RAM 20b, a ROM 20C, a hard disk 20d, a communication interface 20e, an image interface 20f, an input and output interface 20g and other various circuits or apparatuses.

For example, the communication interface 20e is an NIC (Network Interface Card). The communication interface 20e is connected to one port of switching hub 3 via a twisted-pair cable. The image interface 20f is connected to a monitor and sends out an image signal for displaying it on a monitor.

The input and output interface 20g is connected to an external storage device such as a CD-ROM drive, or an input apparatus such as a keyboard or a mouse. The interface 20g inputs, through the input apparatus, the signals indicating how the user operated the input apparatus. Further, the input interface 20g causes an external storage device to read the data recorded on a recording medium such as CD-ROM, and input the data. In addition, the interface 20g outputs the data to be written into a recording medium, to the external storage device.

Figure 5:
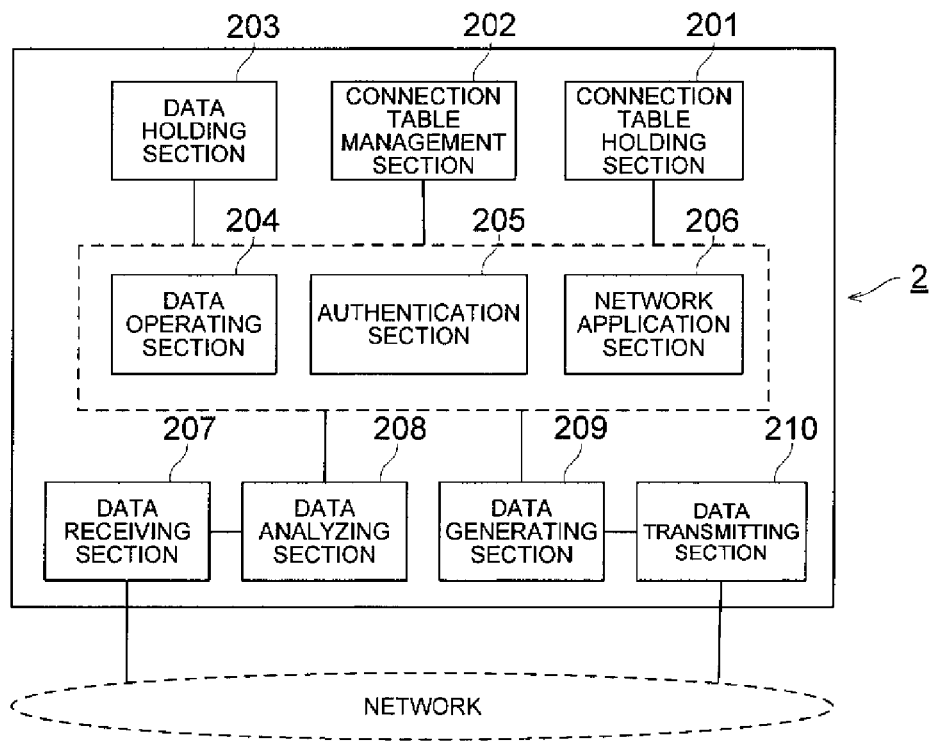
FIG. 5(a) is a block diagram illustrating an example of a functional configuration of the node (terminal) 2.
FIG. 5(b) is a diagram illustrating an internal configuration of the function of a data operating section 204.
Figure 5:
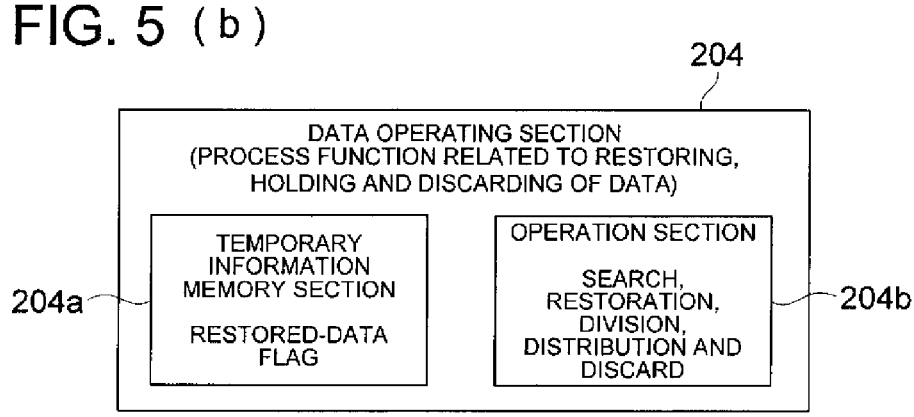

The hard disk 20d will be described later using a functional block diagram (FIGS. 5(a) and 5(b)). The hard disk 20d stores programs and data for realizing the functions of the following sections: a connection table holding section 201, a connection table management section 202, a data holding section 203, a data operating section 204, an authentication section 205, a network application section 206, a data receiving section 207, a data analyzing section 208, of a data generating section 209, and a data transmitting section 210. These programs and data are read out into the RAM 20b as needed, and the program is executed by the CPU 20a.

Each node 2 is given with a host name (machine name), an IP address and a MAC address to be distinguished from the other nodes 2. The host name can freely be given by an administrator of the network 1. The IP address is given in accordance with the rule of the network 1. The MAC Address is an address fixedly given to the communication interface 10e of the node 2.

In this embodiment of the present invention, host names such as "PC1" and "PC2", are given to the nodes (terminal device) 21 and 22, respectively. Hereafter, these nodes 2 may be indicated by their host name.

(Connection Form of Nodes)

Figure 3:
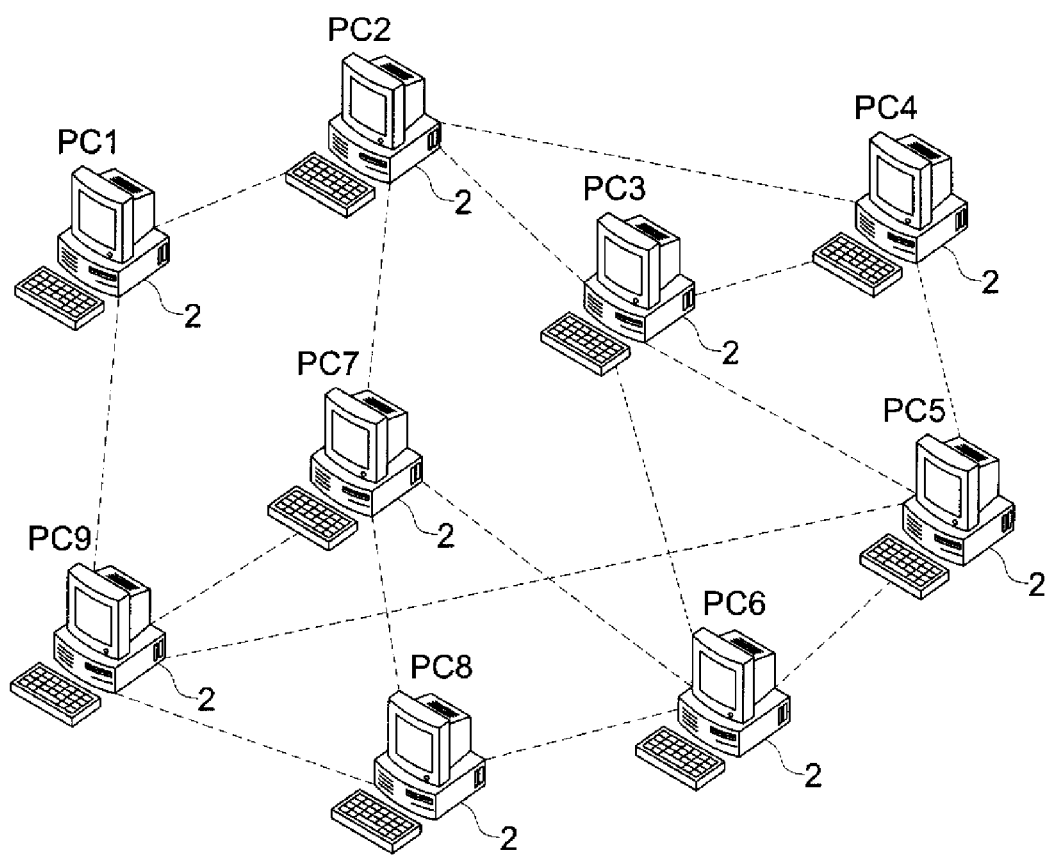
FIG. 3 is a diagram illustrating a connection form of the nodes 2 that constitute the network 1, that is, an example of a logical topology of the nodes.

FIG. 3 is a diagram illustrating an example of a connection form of the nodes. That is, a logical topology of terminal devices 2. The connection form of the nodes (terminal devices) will be described with reference to FIG. 3.

As illustrated in FIG. 3, the nodes 2 are considered to be arranged in a virtual space. As indicated by a dotted line, a node 2 is associated to at least one other neighboring node 2 in the virtual space. In addition, all the nodes 2 are directly or indirectly-associated to each other by this association.

"Directly-associated" refers to the state in which a node is connected to another node with a dotted line in FIG. 3 (for example, a relationship between PC1 and PC2 or PC1 and PC9 of FIG. 3). "Indirectly-associated" refers to a state in which a node is connected to another node through one node or more with more than one dotted line (for example, a relationship of PC1 and PC4 of FIG. 3). The node 2 transmits data to other directly-associated nodes 2 itself.

FIG. 4 illustrates an example of connection tables TL of the nodes 2 associated as illustrated in FIG. 3. Every node 2 holds a list of information as a table, which information is used for connecting to other "directly-associated" nodes 2, to which data can be directly transmitted.

For example, PC1, PC2, PC6, PC7, PC8 and PC9 in FIG. 3 hold connection tables TL1, TL2, TL6, TL7, TL8 and TL9 as illustrated in FIG. 4, respectively.

(Function of Each Section of a Terminal Device)

FIG. 5(a) illustrates a block diagram of an example of a functional configuration of the node (terminal device) 2. A processing function of each section of node 2 will be described with reference to FIG. 5(a).

The connection table holding section 201 stores a connection table TL that indicates a list of attributes, such as a host name, IP address and MAC address of other nodes 2 that is directly-associated to the concerned node 2 itself. For example, an example of the connection table held in the connection table holding section 201 of each node was mentioned already with reference to FIG. 4. The contents of these connection tables TL are created by the administrator in advance based on the association the nodes 2.

The connection table management section 202 manages the connection table TL held at the above-mentioned connection table holding section 201.

The data holding section 203 stores as a file these data: the attribute data indicating the attribute of the node 2 or a user, the data used for a digital certificate of the node itself, a certificate revocation list (CRL), data used by an operating system (OS) or application software, data created by a user with an application software, or other various data.

The authentication server 5 issues a digital certificate in response to a request from the node 2, and the concerned node 2 holds the issued digital certificate. The digital certificate is used for authenticating each other at the time of the communication between the nodes 2. The certificate revocation list (CRL) registers and indicates the invalidity of the digital certificate caused by withdrawal of a node. The authentication server 5 manages the certificate revocation list (CRL), and in this embodiment of the present invention in which P2P communication is used, each node 2 holds the certificate revocation list (CRL), and performs management such as update.

The data operating section 204 stores data in the data holding section 203. The data operating section 204 performs process of updating the data stored in the data holding section 203. For example, the attribute data are updated every time the environment or the setting contents of the node 2 change. Further, the data operating section 204 performs process of updating the certificate revocation list (CRL).

The data operating section 204 also performs temporary storage and process of data (information) acquired from other nodes.

The authentication section 205 performs process of authenticating the other nodes 2 based on the digital certificate transmitted from the other nodes 2. The authentication section 205 verifies whether the transmitted digital certificate is valid or not by referencing the certificate revocation list (CRL) stored in the data holding section 203.

The network application section 206 performs a process for the node 2 attempting to newly participate in the network or withdrawing from the network.

The data operating section 204, the authentication section 205 and the network application section 206 perform data communication with the other nodes 2 in the network 1 via the data receiving section 207 and the data transmitting section 210, as needed. Further, the data operating section 204, the authentication section 205 and the network application section 206 reference or update the data of the connection table holding section 201 and of the data holding section 203, as needed.

FIG. 5(b) illustrates an internal configuration of the function of the data operating section 204. The function of the data operating section 204, that is, a processing function, such as a temporary storage or processing of data acquired from the other nodes, will be described with reference to FIG. 5(b).

The data operating section 204 includes a temporary information storage section 204a that temporarily stores restored-data (restored-information) and a flag that indicates the history of the restored-data. The data operating section 204 also includes an operation section 204b that collects data (information) from the nodes to restore the collected data. When the data is changed, in order to write back the stored data in each node, the operation section 204b performs the process of re-dividing the changed data, a distribution process and a flag update. Then the operation section 204b performs the process of discarding the restored-data in response to the updating of the flag. These processes are controlled so as to perform the following processing operation.

For example, when the operation section 204b collects data (information) from each node and generates restored-data (restored-information), the temporary information storage section 204a temporarily stores the restored-data. In addition to that, the temporary information storage section 204a temporarily stores a flag that indicates the history of the restored-data. The contents of the flag will be described later in detail, and examples of the contents of the flag include when the restored-data was generated or referenced.

The operation section 204b performs a search to collect the data (information) from the other nodes, and when it found out the node that is temporarily storing the restored-data (restored-information), the operation section 204b acquires the restored-data from the node, and uses it. Which means that the operation section 204b functions as a restored-information acquisition device.

Alternatively, when there is no restored-data in the other nodes, the operation section 204b collects the divided-data from the other nodes, generates the restored-data, and temporarily stores the restored-data along with the flag in the temporary information storage section 204a which means that the operation section 204b functions as an information restoring device.

The operation section 204b performs a process of changing the restored-data temporarily stored in the temporary information storage section 204a. Then the operation section 204b replaces the original restored-data with the changed restored-data, and temporarily stores the changed restored-data in the temporary information storage section 204a. The operation section 204b also updates the flag. That is, the operation section 204b functions as a restored-information changing device.

The operation section 204b re-divides the restored-data corresponding to the divided-data before the restoration stored in each node, and writes back the data into newly divided data based on the comparison of the flag for the restored-data and the flag for every data divided before the restoration, and stored in each node. The operation section 204b updates the flag for every divided-data. That is, the operation section 204b functions as a divided-information transmission section.

The operation section 204b similarly references the flag that indicates the history of the restored-data temporarily stored in the temporary information storage section 204a. When the flag satisfies a predetermined condition, the operation section 204b performs a process of discarding the restored-data temporarily stored in the temporary information storage section 204a. This is to avoid the risk of information leak caused by holding the restored-data too long in the temporary information storage section 204a. That is, the operation section 204b also functions as an information discarding section.

The operation section 204b arbitrarily updates the flag in response to occurrence of a state affecting the history of the restored-data, for example such a case where the other node references the restored-data temporarily stored in the temporary information storage section 204a.

The description of each section of the node (terminal device) 2 continues by returning to FIG. 5(*a*).

The data receiving section 207 performs a controlling a process for performing data communication with the other nodes 2. The data receiving section 207 receives only the packet that is needed by the node 2 in the packets that are flowing through the network 1.

The data analyzing section 208 distinguishes the type of the received data by extracting the necessary information from the data received by the data receiving section 207, and by analyzing the contents of the extracted information.

The data generating section 209 creates the transmission data to be transmitted to the other nodes 2 based on instructions of the data operating section 204, the authentication section 205 or the network application section 206.

The data transmitting section 210 transmits the transmission data generated and packetized by the transmission data generating section 209 to the other nodes 2.

(SSL Communication Between Nodes)

The node 2 in this embodiment of the present invention can perform SSL (Secure Sockets Layer) communication between the nodes 2 directly or indirectly associated to each other. SSL is a protocol for safely transmitting and receiving data on a network by encrypting using a digital certificate. The flow of the process that establishes a connection of the SSL communication in this embodiment of the present invention will be described below.

The standard specifications of a common digital certificate and a certificate revocation list (CRL) are defined as X.509 by ITU (International Telecommunication Union). In the following description of the SSL communication, the digital certificate is called X.509 certificate.

Figure 6:
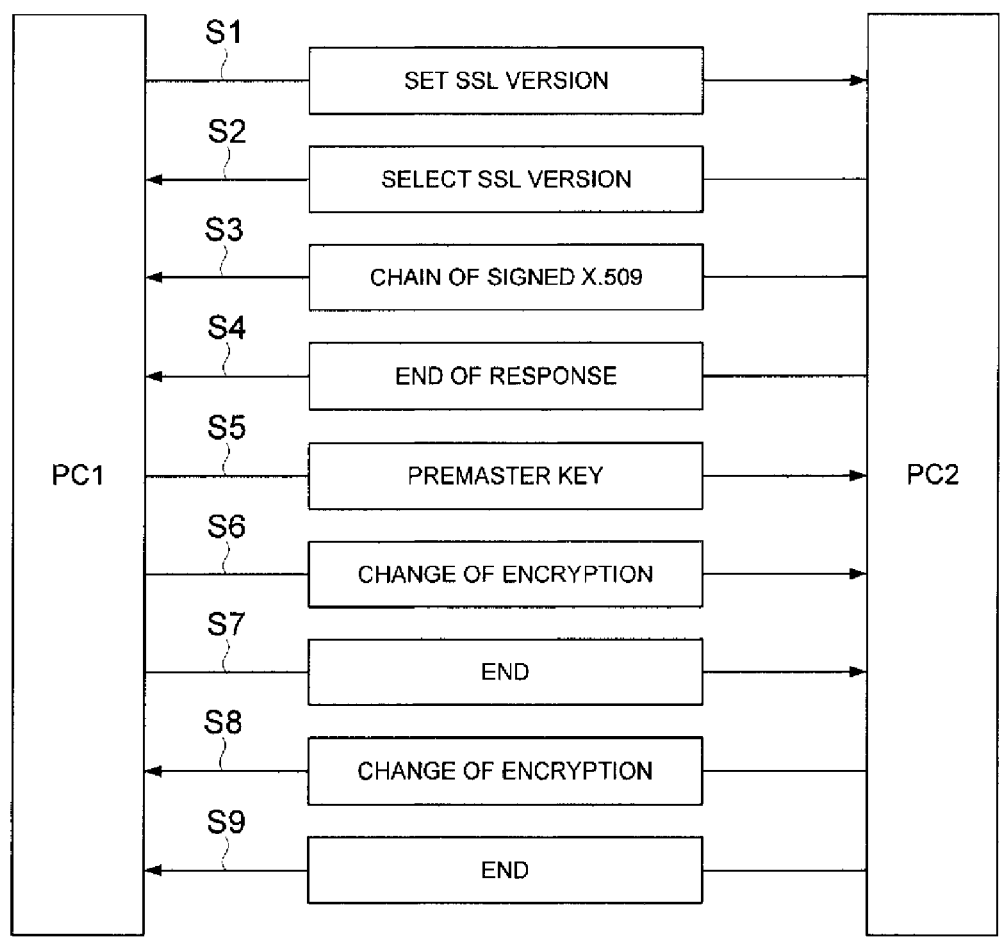
FIG. 6 is a sequence diagram describing an example of the process at the time of establishing a connection of an SSL communication.

FIG. 6 is a diagram illustrating an example of the flow of the process at the time of establishing the connection with the SSL communication. The case where the nodes, for example, PC1 and PC2 of FIG. 3 are attempting to perform an intended communicate will be described further in detail in reference to FIG. 6.

As a STEP preceding the establishment of the connection with SSL communication, the connection itself is established. Assuming that a command for requesting a communication with PC2 is inputted by a user operating a keyboard on PC1, for example, the data generating section 209 creates a connection request data. The data transmitting section 210 transmits the connection request data to the other node PC2.

Then, in PC2, the data receiving section 207 receives the connection request data from PC1, and the data analyzing section 208 analyzes the data type of the received data. In this case, the data will be obviously analyzed to be the connection request data. The data generating section 209 of PC2 generates connection permission data that indicates the permission for connection. Then the data transmitting section 210 of PC2 transmits the connection permission data to PC1.

When the connection permission data is received by the data receiving section 207 of PC1, and a predetermined process is performed after that, then PC1 and PC2 are connected. However, at this time, the connection of the SSL communication is not established yet, and the process then enters into a flow of establishment of the SSL connection.

First, in either PC1 or PC2, the data generating section 209 generates the SSL version data indicating the available SSL version, and the data transmitting section 210 transmits the SSL version data to the other node (STEP S1). In FIG. 6, PC1 transmits the SSL version data to PC2.

Then, in PC2, the data receiving section 207 receives the SSL version data, the data analyzing section 208 analyzes the type of the data, and the data generating section 209 selects, from the versions indicated by the SSL version data, one version that can be handled by PC2, and generates the SSL version selection data indicating the selected version. The data transmitting section 210 of PC2 transmits this SSL version selection data to PC1 (STEP S2).

In PC1, when the SSL version selection data from PC2 is received by the data receiving section 207, the indicated SSL version is adopted as a protocol for the intended communication. The SSL version is adopted the same way in PC2.

Subsequently, in PC2, a X.509 digital certificate is transmitted to PC1. In case where this X.509 certificate is not signed by the known authentication server 5, a chain of the old certificates up until this point is also transmitted. PC1 has in advance a root certificate verifying the authentication server 5, and PC1 checks whether a certificate that signed X.509 certificate received from PC2 exists in them. Further, PC1 checks whether the certificate is included in the certificate revocation list (CRL) issued by the authentication server 5 that signed the concerned certificate. When the certificate is included in the certificate revocation list (CRL), the communication is interrupted at this time (STEP S3).

When the certificate passes the above-mentioned authentication process, PC2 notifies PC1 that PC2 has finished responding (STEP S4).

In response to receiving the notice of the end of the response from PC2, PC1 generates a premaster key with a random value of 384 bits in order to generate a common key to be used in the SSL communication. The data generating section 209 of PC1 encrypts the premaster key with a public key of PC2 contained in X.509 certificate received from PC2, and transmits the premaster key to PC2 (STEP S5).

Based on this premaster key, PC1 generates the common key actually used for encrypting data. Then, PC1 begins to use the common key as the encryption key for communication. PC1 also transmits to PC2 a notice of change of encryption informing of change of encryption (STEP S6).

When PC2 receives the notice of end of change of encryption from PC1 (STEP S7), the notice of change of encryption is also transmitted to PC1 in order to perform the change of the encryption key in PC2 (STEP S8). The data receiving section 207 of PC2 decodes the premaster key, which is encrypted with its public key and received from PC1, with the corresponding secret key. When the data analyzing section 208 verifies that the type of data is a premaster key by analyzing the data, the data operating section 204 generates a common key based on the received premaster key. Henceforth, between PC1 and PC2, an encrypted communication using the common key is performed. That is, an encryption key has been changed.

After the change of the encryption key is finished as above-mentioned, PC2 transmits the notice of the end of a change of encryption to PC1 (STEP S9).

By the above-mentioned process, the SSL connection is established between PC1 and PC2. Whereby, intended communication can safely be performed.

In the above-mentioned establishment of the connection, the case in which PC1 verifies the X.509 certificate of PC2 was illustrated. However, PC2 may simultaneously verify the X.509 certificate of PC1. This is called a SSL client authentication communication.

In order to perform this SSL client authentication communication between PCs and between authentication servers, each node needs to hold an X.509 certificate. Further, in order to verify the certificate, the node also needs to hold the root certificate.

Thus, each node 2 of the network 1 can achieve the operation for safely communicating with each other as the authenticated nodes.

(Distributed and Shared Information, and Restoring it to Use)

In the network 1 according to this embodiment of the present invention, as mentioned above, a mutual authentication, establishment of the SSL communication, and transmission and reception of data are performed between the "associated" nodes (terminal device 2), which are prescribed in the connection table TL.

Data (information) that are divided, distributed to and shared with the nodes can be used in any node through searching and collecting based on such communication. In the following descriptions, all of the information which is distributed to and shared with each node, and is to be acquired and restored will be referred to as data.

First, the process of distributing and sharing the data file will be described.

The data to be distributed and shared is passed onto the data operating section 204. The operation section 204*b* of the data operating section 204 divides data by a known method. As a data dividing method, for example, a striping method may be used, in which method a document is divided into pieces by a unit of line. The publicly known methods may be used such as a two-dimensional parity method, a multiplex parity method and a reed-solomon method.

The data operating section 204 determines where to distribute this divided-data in accordance with the connection table TL held in the connection table holding section 201. The distribution may be determined arbitrarily. Alternatively, a certain weighting may be set to the nodes, and the data may be distributed based on the weighting.

The divided-data are sent to the data generating section 209 to be formed into a network packet form, and are transmitted to the assigned node through the data transmitting section 210.

In the node that received the divided-data, the received divided-data is finally stored in the data holding section 203 via the data receiving section 207, the data analyzing section 208 and the data operating section 204. When there is an access from the other nodes, the operation section 204*b* of the data operating section 204 references the data holding section 203 and performs process of providing data and other processes.

In the information management method in the above-mentioned network 1 according to this embodiment of the present invention, in order to improve the efficiency of the use and restoration of data distributed to and shared with each node, the restored-data is temporarily stored in the temporary information storage section 204*a* in the node in which the data restoration was performed. Further, the node keeps the restored-data in the state that the other nodes can access the restored-data, and discard the restored-data after a certain period by using the flag.

In the flow from the generation to discard of the restored-data, processes may be executed, such as changing, writing-back of data, and access from the other nodes. Example of such typical flows will be described below.

(Example of Entire Process from Information Restoration to Information Discarding)

Figure 7:
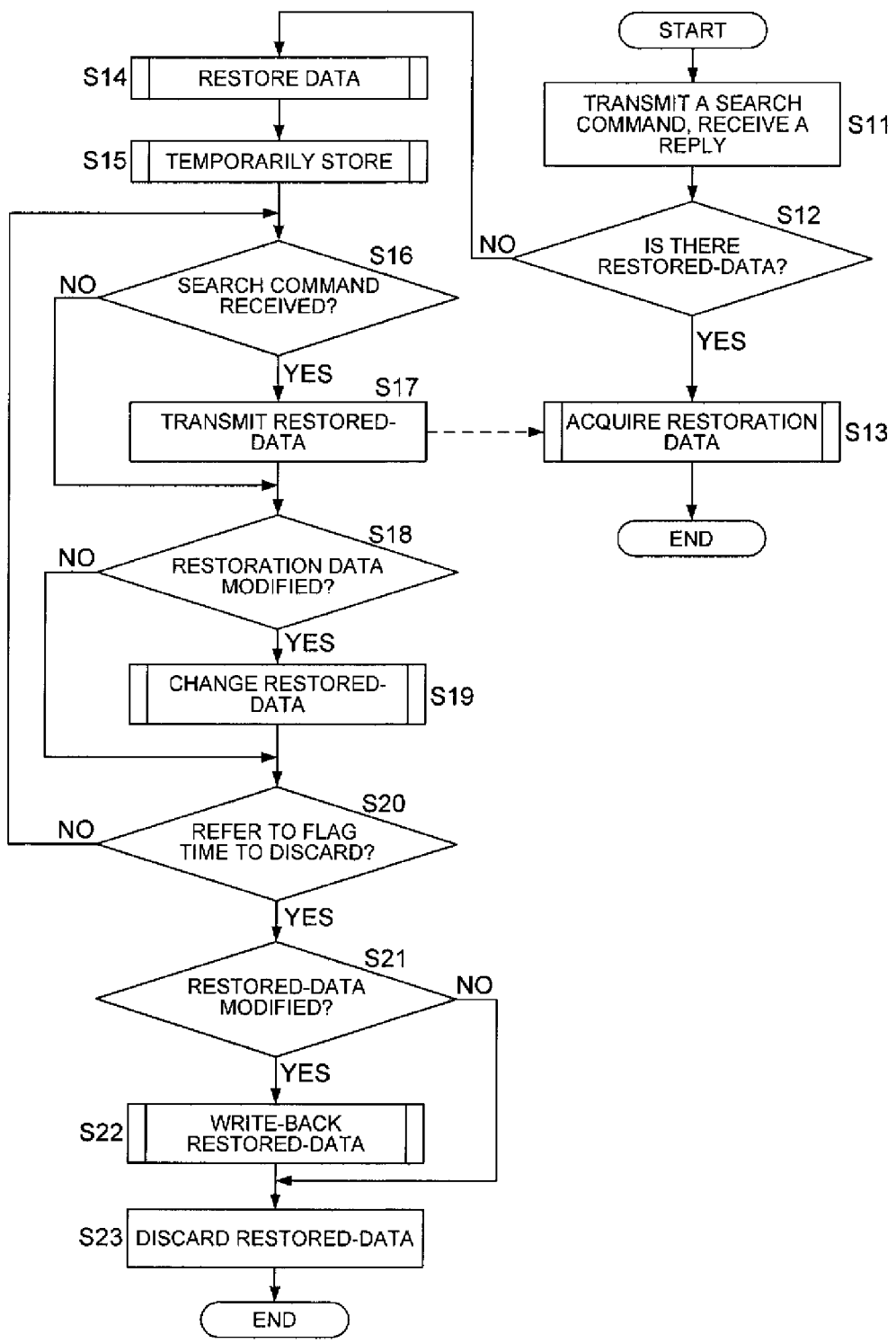
FIG. 7 is a flow chart illustrating a typical process flow from generation to discard of the restored-data.

FIG. 7 illustrates a flow chart showing a typical process flow from generation of the restored-data to the discarding of the restored-data. An outline of a process example will be described as a whole with reference to FIG. 7.

First, a node 2A that is to use the distributed and shared data transmits a search command to each node and receives a response (STEP S11). The search command may be multicast or broadcast using UDP (User Datagram Protocol). The search command may also be transmitted by unicast in accordance with the connection table TL held in the connection table holding section 201.

Thereby, the node 2A recognizes each node 2B that is storing the divided-data. Further, the node 2A also recognizes whether there is a node 2C that already restored the divided-data and temporarily stores the restored-data.

In STEP S12, it is determined whether there already is restored-data temporarily stored. When the restored-data already exists (STEP S12: YES), the process proceeds to STEP S13, and a process of acquiring the restored-data is performed. The restored-data acquisition process of STEP S13 will be mentioned later. When the restored-data does not exist (STEP S12: NO), the process proceeds to STEP S14, and a process of data restoration is performed. The data restoration process of STEP S14 will be mentioned later.

In STEP S15, a temporary storage of the restored-data is performed. Setting up a flag is also performed. The process of temporary storage of data will be mentioned later. From here to the point of time when the flag is referenced in STEP S20, every time there is a change in the history regarding the restored-data, such as access from the other node, the flag is updated.

In STEP S16, it is checked whether there is a search command searching for the restored-data from the other nodes. When there is the search command (STEP S16: YES), the process proceeds to STEP S17. Then, the node replies that there is the restored-data, and provides the restored-data. In addition, the restored-data may have already been changed before this time. The restored-data acquisition process in such a case will also be mentioned later. When there is no search command (STEP S16: NO), the process proceeds to STEP S18.

In STEP S18, it is determined whether to change the stored restored-data or not. When performing the change (STEP S18: YES), the process proceeds to STEP S19, and the restored-data changing process is performed. There is the case in which the node that holds the restored-data requests the change or the case in which the other node requests the change. Both cases will be described later. When not performing the change (STEP S18: NO), the process proceeds to STEP S20.

In STEP S20, the flag of the stored restored-data is referenced, and whether it is time to discard the data or not is determined. The data discarding determining process will be described later.

When it is time to discard the data (STEP S20: YES), the process proceeds to the following STEP S21. When it is not time to discard the data (STEP S20: NO), the process returns to STEP S16. STEP S16 through STEP S20 are repeated until it is time for discarding the data.

In STEP S21, before discarding the restored-data, whether the restored-data has been changed or not is determined. When the data has been changed (STEP S21: YES), the process proceeds to the following STEP S22. Then the process of writing back the restored-data is performed. The process of writing back will be described later in detail. When the data has not been changed (STEP S21: NO), the process proceeds to STEP S23. Then the discarding process of the restored-data is performed.

The above is a flow of typical process from generating the restored-data to discarding the restored-data. The more detailed example of the process of each step will be described below.

(Information Restoration Processing and Temporary Storage Processing)

Figure 8:
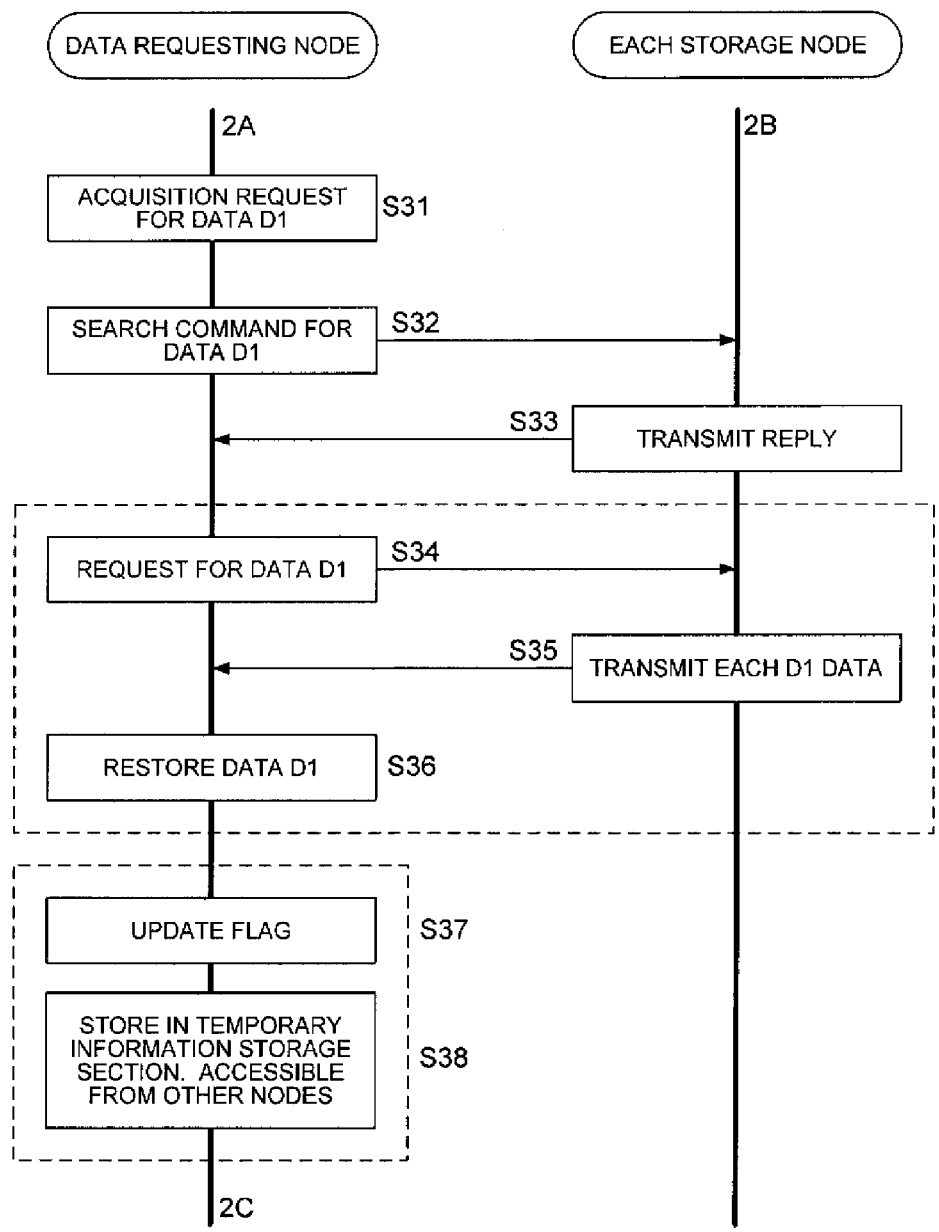
FIG. 8 is a sequence diagram showing a flow of an example of a process of generating the restored-data of FIG. 7 and an example of temporary storage process.

FIG. 8 illustrates a sequence diagram showing an example of the restored-data generating process corresponding to STEP S14 of FIG. 7, and a flow of an example of the temporary storage process corresponding to STEP S 14 of FIG. 7. The example of the temporary storage process and the example of the data restoration process between two nodes, a node 2A (hereafter, referred to as PC1 in this page) that requests the data and a node 2B (hereafter, referred to as PC2 to PC7) that stores the divided-data, will be described with reference to FIG. 8.

<Information Restoration Process>

First, in the node 2A, when a request to use data D1 distributed and shared is generated (STEP S31), a search command is transmitted to each node 2B from the node 2A (STEP S32). In response to the search command, each node 2B which the data D1 is distributed to and shared with transmits a response to the node 2A (STEP S33). Then the node 2A acquires the response. Thereby, the node 2A recognizes each node 2B that store the divided-data. Further, the node 2A also recognizes that none of the node 2C temporarily stores the restored divided-data.

The above is the same as that of STEP S11 of FIG. 7. However, note that, in this case, there is no node 2C that temporarily stores the restored-data D1.

Figure 9:
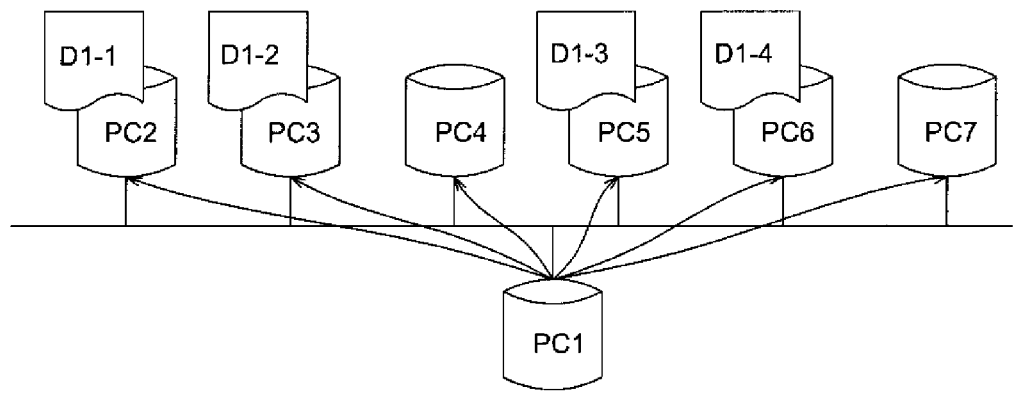
FIG. 9(a) is a diagram illustrating a state in which PC1 is transmitting a search command to PC2 through PC7.
FIG. 9(b) is a diagram illustrating a state in which PC2 through PC7 are replying to PC1.
Figure 9:
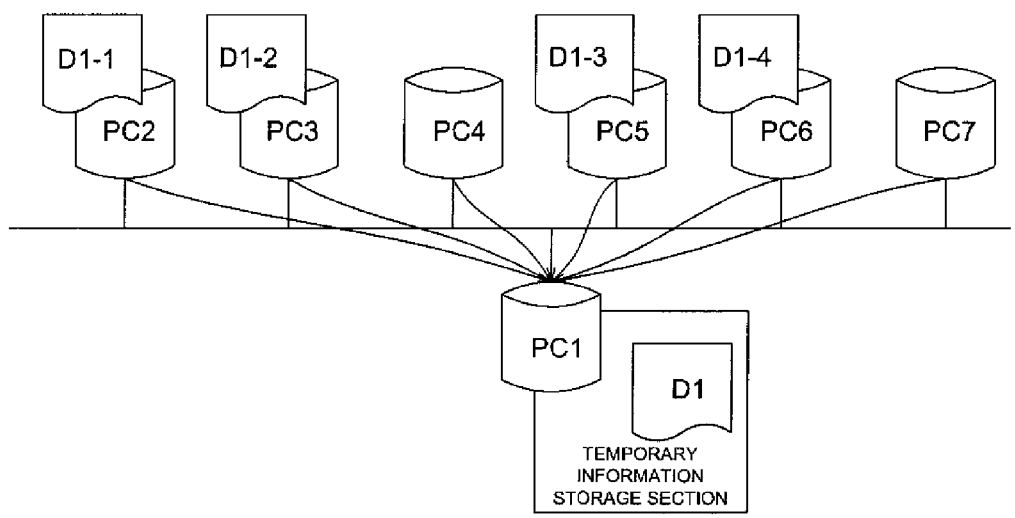

FIG. 9(a) illustrates a state in which PC1 functioning as the node 2A is transmitting a search command to PC2 to PC7. FIG. 9(b) illustrates a state in which PC2 to PC7 are returning a response to PC1. In this case, PC1 recognizes that PC2, PC3, PC5 and PC6 store the divided-data D1-1 to D1-4, respectively.

However, in this case, not all of the nodes that received the search command may reply a respond. Some nodes may not return a response for the reason of occurrence of failure or some other thing. If PC6, for example, does not respond in FIG. 9(b), the data D1-4 cannot be acquired.

In such a case, the node 2A selects one of the options: acquiring all the divided-data to generate the restored-data D1, and generating a partial restored-data D1' with the attainable data D1-1 to D1-3. Since data are divided generally with redundancy, there may be a case that the entire data is restored from partial data.

Figure 10:
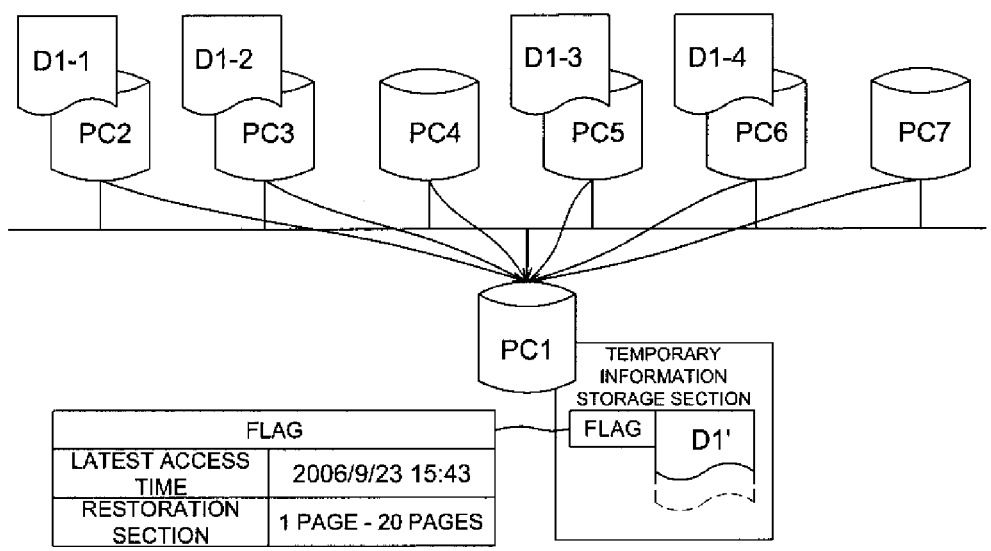
FIG. 10 is a diagram illustrating an example of PC1 acquiring distributed data and partially performing a restoration process.

Data does not necessarily need to be restored entirely. If not in the above case, intentionally partially restored data may be enough. FIG. 10 illustrates an example of acquiring divided-data and performing the restoration process for just the first 20 pages. In this case, which part is restored is indicated in the flag to inform a node attempting to acquire the restored-data. In the case of partial restoration, the restored part needs to include enough information to read out and to use.

When all of each node 2B have retuned the response, the data operating section 204 of the node 2A requests the data transmission from each node 2B storing the divided-data D1-1 through D1-4 in the following STEP S34. In response to these requests, each node 2B returns, in STEP S35, the divided-data D1-1 to D1-4 stored each in nodes 2B.

Subsequently, in STEP S36, the data operating section 204 of the node 2A generates original pre-divided-data as the restored-data D1 using the acquired divided-data D1-1 to D1-4. That is, from the above-mentioned STEP S34 to STEP S36 function as the information restoration process.

<Temporary Storage Processing>

Next, in STEP S37, the data operating section 204 of the node 2A sets up a flag corresponding to the restored-data D1. First, a content of the flag is restoration time. However, other than the restoration time, the information regarding its history, such as when referenced, read-out and writing-in, is included in the flag. After the following temporary storage, change of the history will be updated every time there is a change.

Next, in STEP S38, the data operating section 204 of the node 2A stores the restored-data D1 and its flag to the temporary information storage section 204a in the node 2A in a state that is accessible from other nodes. That is, the above-mentioned STEP 37 to STEP S38 function as the temporary storage process.

After the temporary storage process of this restored-data D1, the node 2A becomes a temporary storage node 2C of the restored-data.

(Restored-Information Acquisition Process)

Figure 11:
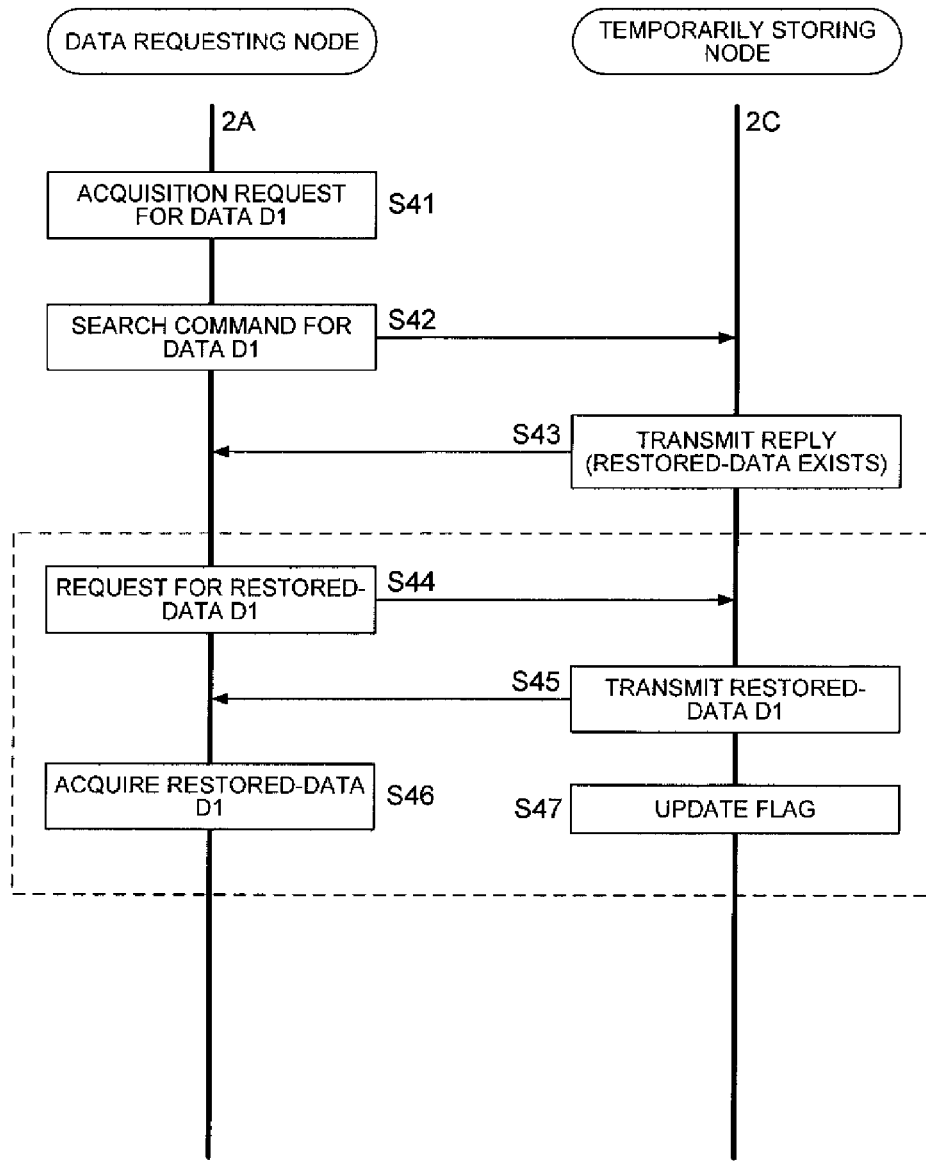
FIG. 11 is a sequence diagram showing a flow of an example of an acquisition process of restored-data of FIG. 7.

FIG. 11 illustrates a sequence diagram showing a flow of an example of a restored-data acquisition process equivalent to STEP S13 in FIG. 7. The example of the restored-data acquisition process between the node 2A (hereafter referred to as PC1 in this page) that requests the data, and the node 2C (hereafter referred to as PC7 in this page) that temporarily stores the restored-data D1 will be described with reference to FIG. 11.

<When No change in Restored-Data>

The following STEP S41 to STEP S43 are the same as STEP S31 to STEP S33 regarding the information restoration process of FIG. 8. However, there is a premise that the temporary storage node 2C of the restored-data D1 exists in this case.

First, when a request to use the distributed and shared data D1 is generated in the node 2A (STEP S41), the node 2A transmits the search command to each node (including node 2C) (STEP S42). In response to the search command, each node which the data D1 is distributed to and shared with transmits a response. Then, the node 2C replies that the node 2C is temporarily storing the restored-data D1 (STEP S43). Thereby, the node 2A recognizes the existence of the node 2C (here PC7) that temporarily stores the restored-data D1, and recognizes each node 2B that stores the divided-data.

Figure 12:
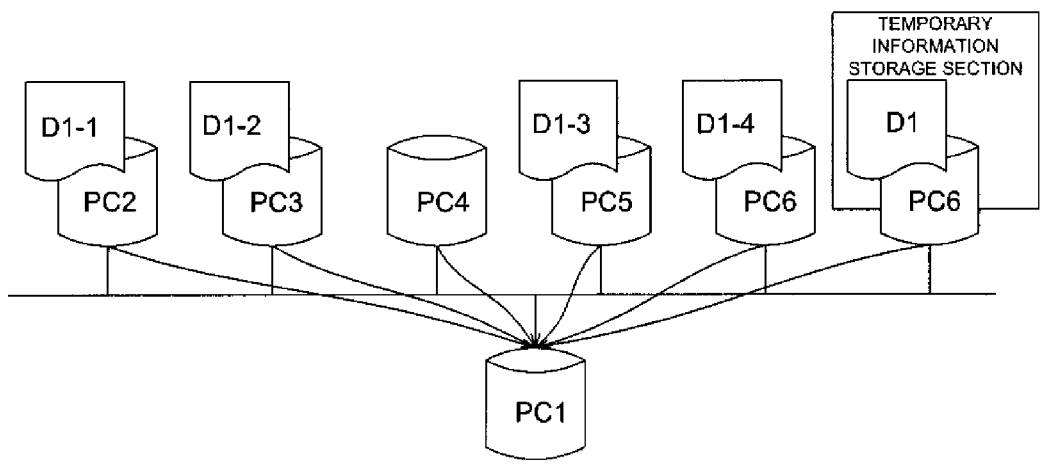
FIG. 12(a) is a diagram illustrating a state in which PC2 through PC7 are replying to PC1 when the restored-data is not changed.
FIG. 12(b) illustrates a state in which PC2 to PC7 are replying to PC1 when the restored-data is changed.
Figure 12:
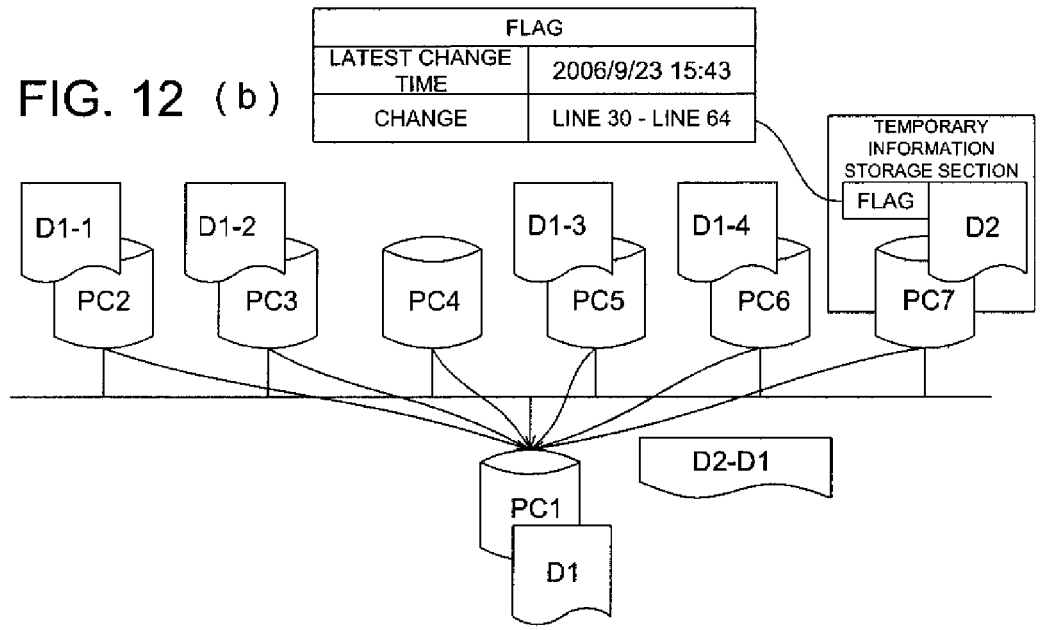

FIG. 12(a) illustrates the state in which PC2 to PC7 are replying to the search command to PC1 functioning as the node 2A. Here, PC1 recognizes that PC2, PC3, PC5 and PC6 are storing the divided-data D1-1 to D1-4, respectively, and recognizes that PC7 already temporarily stores the restored-data D1. Therefore, PC1 can efficiently acquire the restored-data D1 from PC7 without collecting the divided-data D1-1 to D1-4.

Next, in STEP S44, the data operating section 204 of the node 2A requests the restored-data transmission to the node 2C that temporarily stores the restored-data D1. In response to this, in STEP S45, the node 2C returns to the node 2A the restored-data D1 that is temporarily stored in the node 2C.

Subsequently, in STEP S46, the data operating section 204 of the node 2A acquires the restored-data. In STEP S47, the node 2C that provided the restored-data updates the history of the flag. That is, the above-mentioned STEP S44 to STEP S47 function as the restored-information acquisition process.

<When Restored-Data Updated>

Figure 13:
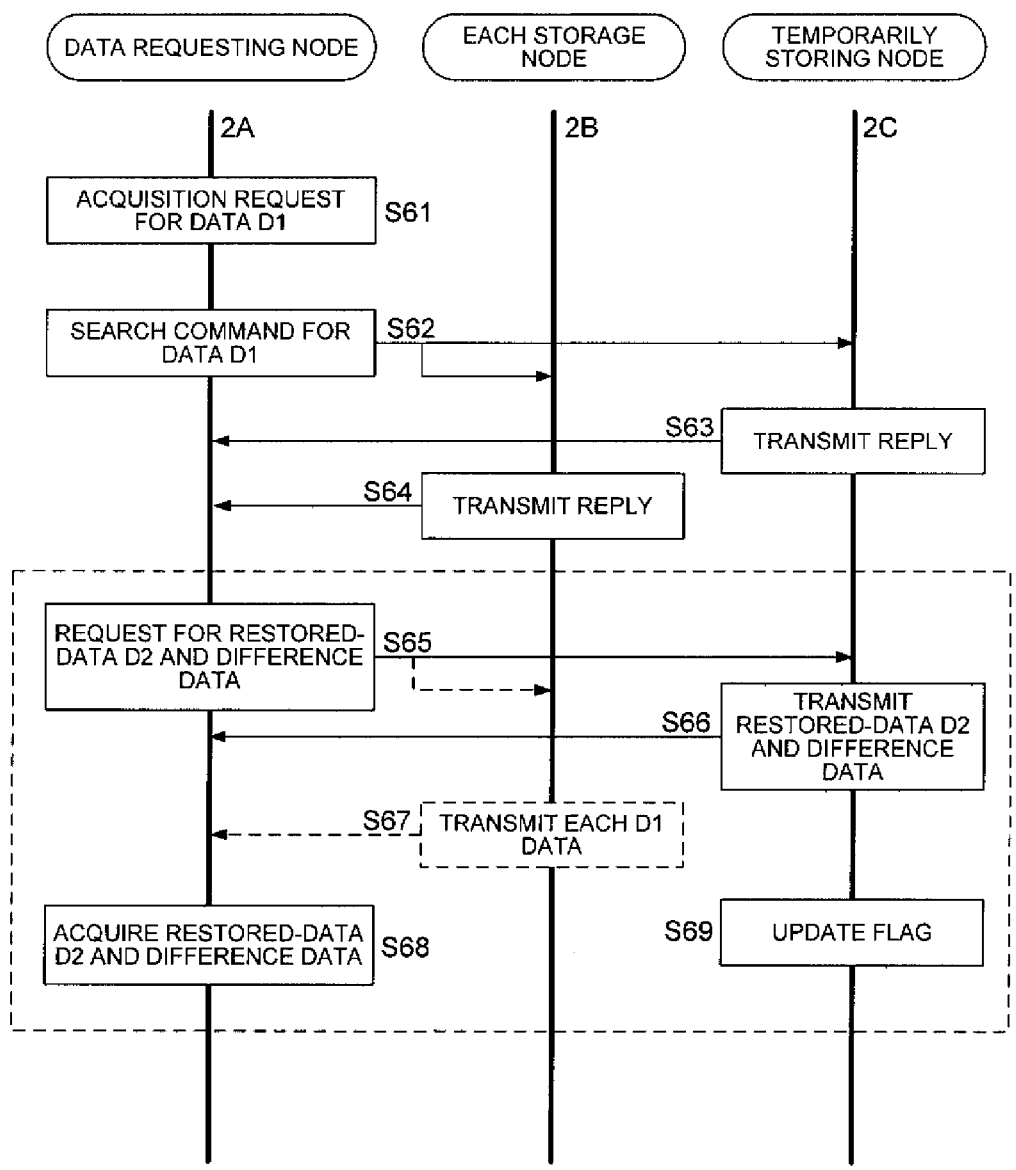
FIG. 13 illustrates a sequence diagram of a flow of an acquisition process example of the restored-data of FIG. 7 in case when the restored-data is changed.

Similarly, FIG. 13 illustrates a sequence diagram showing an example of the flow of the restored-data acquisition process corresponding to STEP S13 of FIG. 7, and a change is added to the restored-data itself (change of restored-data will be mentioned later).

The example of the restored-data acquisition process between the node 2A (hereafter referred to as PC1 in this page) that requests the data, and the node 2C (hereafter referred to as PC7 in this page) that temporarily stores the changed restored-data D1 will be described with reference to FIG. 13.

The following STEP S61 to STEP S63 are the same as STEP S41 to STEP S43 regarding the restored-information acquisition process of FIG. 11. However, in this case, there is a premise that the restored-data held by the temporary storage node 2C has been already changed to the restored-data D2.

First, when a request to use the distributed and shared data D1 is generated in the node 2A (STEP S61), the node 2A transmits the search command to each node 2B (including node 2C) (STEP S62). In response to the search command, each node which the data D1 is distributed to and shared with transmits a response (STEP S64), and the node 2C responds to the node 2A that the node 2C is temporarily storing the restored-data D2 (STEP S63). Thereby, the node 2A recognizes the existence of the node 2C (here PC7) that temporarily stores the changed restored-data D2, and recognizes each node 2B that stores the divided-data.

FIG. 12(b) illustrates a state in which PC2 to PC7 are responding to the search command to the PC1 as the node 2A. Here, while PC1 recognizes that PC2, PC3, PC5 and PC6 store the divided-data D1-1 to D1-4, respectively, PC1 recognizes that PC7 has already temporarily stored the restored-data D2.

The restored-data D2 has been already changed. The contents of change can be recognized from the history indicated in the flag. Therefore, PC1 is able to collect the divided-data D1-1 to D1-4. Also PC1 is able to acquire the changed restored-data D2. Further, PC1 is able to acquire the original restored-data D1 and the difference of change D2-D1 based on the restored-data D2.

Next, in STEP S65, for example, the data operating section 204 of the node 2A requests from the node 2C the transmission of the restored-data D2 and the changed data D2-D1. In response to this, in STEP 566, the node 2C transmits the temporarily stored restored-data D2 and the changed data D2-D1, which is the difference of the original restored-data D1 and the restored-data D2. In some cases, the restored-data D1 can be generated by collecting the divided-data from the node 2B as in STEP S67. The changed data D2-D1 and the restored-data D1 are acquired as needed. There may be a case in which only the restored-data D2 is acquired.

Subsequently, in STEP S68, the data operating section 204 of the node 2A acquires the restored-data D2 and the difference data D2-D1. In STEP S69, the node 2C that provided the restored-data updates the history of the flag. That is, the above-mentioned STEP S65 to STEP S69 function as the restored-information acquisition process.

(Restored-Information Change Process)

Figure 14:
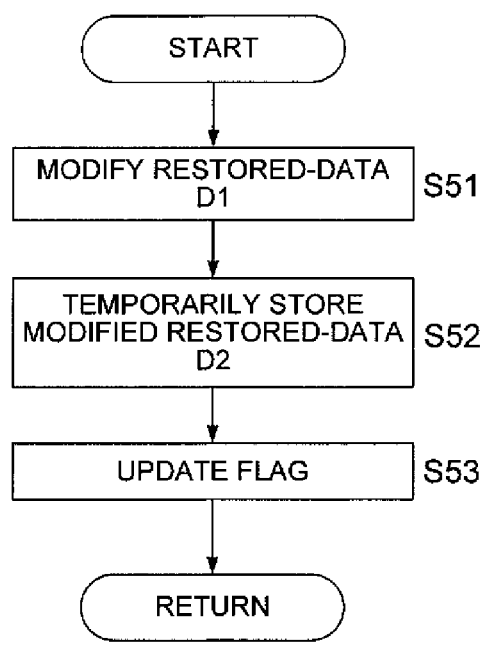
FIG. 14 illustrates a sequence diagram showing a flow of an example of changing process of restored-data of FIG. 7.

FIG. 14 illustrates a sequence diagram showing a flow of an example of a restored-data change process corresponding to STEP S19 of FIG. 19. The example of the restored-data change process in the node 2C that temporarily stores the restored-data D1 will be described with reference to FIG. 14.

When a request for change of the restored-data D1 is generated, first in STEP S51, the data operating section 204 performs the process of changing the restored-data D1 temporarily stored in the temporary information storage section 204a. Subsequently, in STEP S52, the data operating section 204 replaces the restored-data D1 with the changed restored-data D2 in the temporary information storage section 204a to be newly stored.

Next, in STEP S53, the data operating section 204 updates the flag. The time when the data was changed last time and the contents of the change, for example, are indicated in the flag.

That is, the above-mentioned STEP S51 to STEP S53 function as the restored-information change process.

<When Changed on Demand of Other Nodes>

Figure 15:
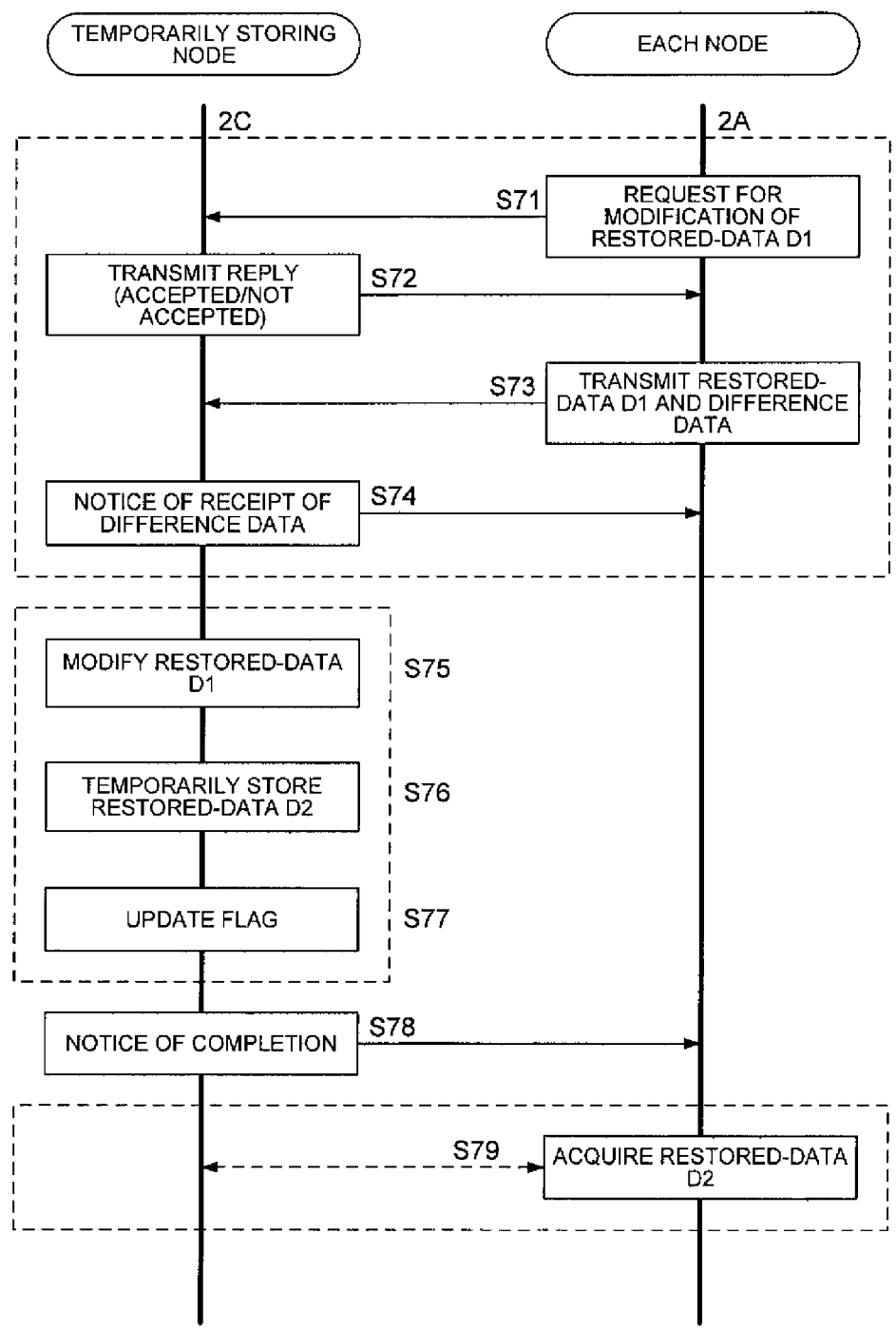
FIG. 15 illustrates a sequence diagram showing a flow of an example of changing process of restored-data of FIG. 7 in case when there was a request for the changing process from other nodes.

FIG. 15 illustrates a sequence diagram showing the flow of an example of the restored-data change process corresponding to STEP S19 of FIG. 7. The changing process is requested from the other node 2A. The example of the restored-data change process between the node 2A that requests the change of the restored-data D1 and the node 2C that temporarily stores the restored-data D1 will be described with reference to FIG. 15.

The following STEP S71 to STEP S74 are an example of the process in the case where the change of restored-data D1 is requested from the other nodes 2A. There is a premise that the node 2A recognizes that the node 2C temporarily stores the restored-data. The contents of change are instructed by the node 2A, and the process of changing is executed in the node 2C.

First, in STEP S71, the node 2A transmits the change request of the restored-data D1 to the node 2C. In response to the change request, the node 2C transmits the response of whether to approve the request or not to the node 2A in STEP S72. When the node 2C approves the change, the node 2A transmits the restored-data D1 and its changed section, or the changed restored-data D2 itself to the node 2C in STEP S73. In STEP S74, the node 2C transmits the acknowledgment of receipt of the contents of change to the node 2A. Then the node 2C begins the change process of the temporarily stored restored-data D1.

The following STEP S75 to STEP S77 are the same as STEP S51 to STEP S53, which are the restored-information change process of FIG. 14. Therefore, the description will be omitted. That is, STEP S75 to STEP S77 function as the restored-information change process.

Next, in STEP S78, the data operating section 204 of the node 2C notifies the completion of the restored-data change process to the node 2A.

Further in STEP S79, the node 2A acquires the changed restored-data from the node 2C and verifies the changed restored-data. The procedure of acquiring the changed restored-data is not described in detail. However, the procedure may follow the already mentioned procedure of the restored-data acquisition process (FIG. 11 or FIG. 13).

(Process of Assigning Information Restoration)

Figure 16:
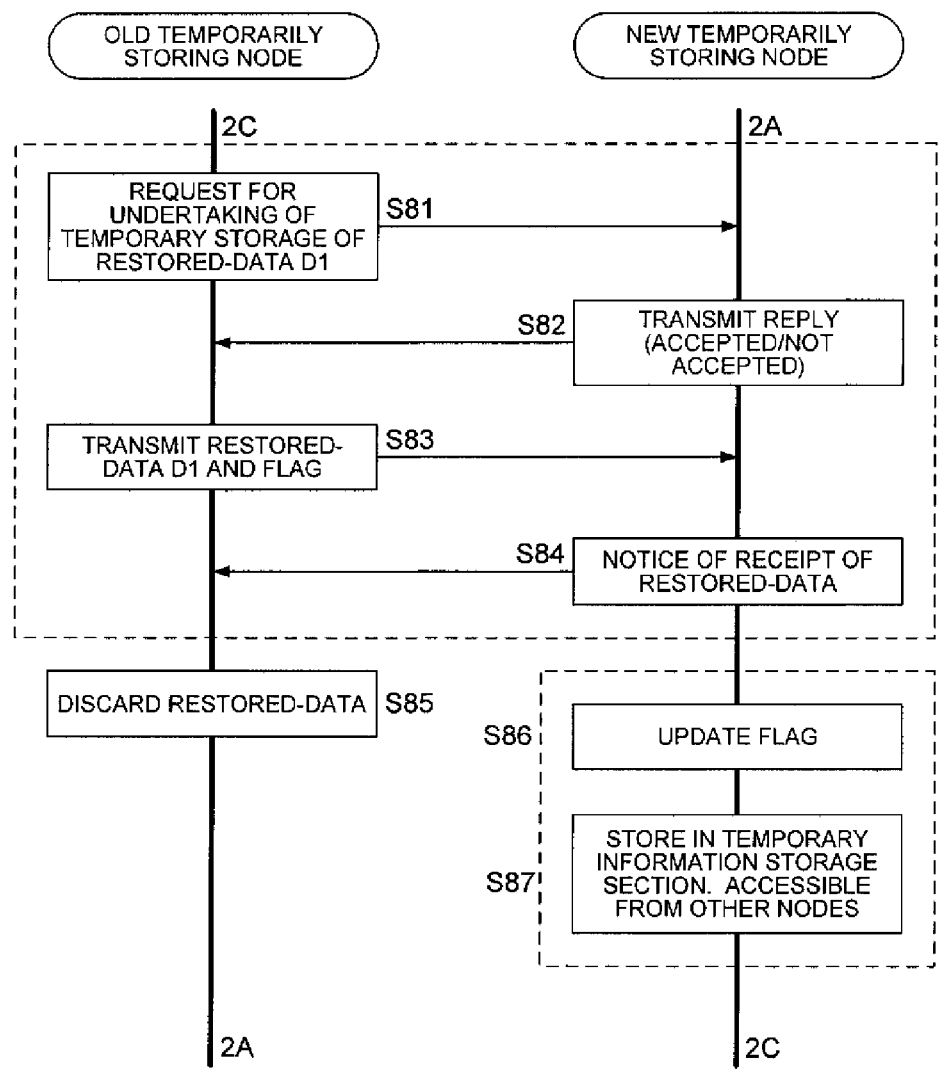
FIG. 16 illustrates a sequence diagram showing a flow of an example of a assignment process of the restored-data to other node.

FIG. 16 illustrates a sequence diagram showing a flow of an example of a restored-information assigning process to the other nodes. This process is not indicated in FIG. 7. However, this is a process that can be performed at an arbitrary time between the temporary storage of the restored-data in STEP S15 and the discarding of the restored-data in STEP S23 of FIG. 7. That is, this is a process for assigning the role of a temporary storage node to the other nodes.

The example of the restored-data assigning process between the node 2C that issues assignment of the temporary storage of the restored-data and the node 2A that accepts the temporary storage of the restored-data will be described with reference to FIG. 16. When the process ends, the node 2A becomes the node 2C and the node 2C becomes the node 2A.

The change of roles assigner and accepter can be requested by either node. FIG. 16 illustrates a case in which the node 2C being the temporary storage node requests the assignment.

First, in STEP S81, the node 2C transmits the request for undertaking of the temporary storage of the restored-data to the other suitable node 2A. In STEP S82, in response to the assignment request the node 2A, for example, transmits the response of approval.

In STEP S83, the node 2C receives the response of approval from the node 2A and transmits the information, such as the restored-data D1 and the attached flag, to the node 2A. In STEP S84, the node 2A that received the information, such as the restored-data D1 and the attached flag, transmits acknowledgment of receipt to the node 2C. Then the processes of assignment and acceptance end.

Subsequently, in STEP S85, the node 2C that finished the assignment discards the information regarding the stored restored-data D1. That is, STEP S85 functions as an information discarding process. Thereby, the node 2C is no longer the temporary storage node. That is, the node 2C is not the node 2C any longer.

Next, in the node 2A that accepted the assignment, the temporary storage process is performed. In STEP S86, the history of the flag accompanying the acceptance of the restored-data is updated. In STEP S87, the restored-data D1 and its flag are temporarily stored in the temporary information storage section 204a in a state where the information is accessible from the other node. That is, STEP S86 to STEP S87 function as the temporary storage process.

Thereby, the node 2A that accepted the assignment becomes the temporary storage node. That is, the node 2A becomes the node 2C. This situation is kept until the information discarding process for discarding the restored-data accepted by this node is executed.

(Divided-Information Change Process)

Figure 17:
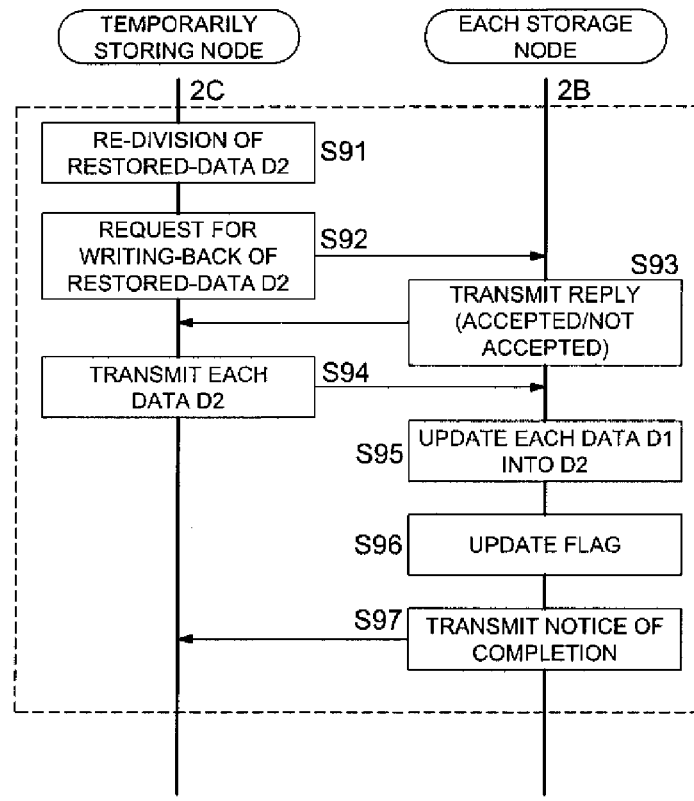
FIG. 17 illustrates a sequence diagram showing a flow of an example of writing-back process of restored-data, that is, a divided information changing process of FIG. 7.

FIG. 17 is a sequence diagram showing the flow of an example of a writing-back process of the restored-data, that is, the process is a divided-information change process that is corresponding to STEP S22 of FIG. 7. The example of the restored-data writing-back process between the node 2C that temporarily stores the restored-data (hereafter referred to as PC1 in this page) and each node 2B (hereafter referred to as PC2 to PC7) that stores the original divided-data will be described with reference to FIG. 17.

The writing-back process is executed when the restored-data is changed as already mentioned in reference to FIG. 7. Further, the writing-back process is executed from the time when that was determined to be the time for discarding the information (STEP S20) until before executing the discarding process (STEP S23). Therefore, with a premise that the temporarily stored restored-data will be discarded, the following writing-back process is executed in order to reflect the changed content to the originally stored divided-data.

First, in STEP S91, the temporarily stored restored-data D2 is divided again, to be written back, in the temporary information storage section 204a in the data operating section 204 of the node 2C. The restored-data 2D is divided in such a manner that each divided D2 corresponds to the originally stored data divided to be distributed to and shared with.

Next, in STEP S92, the node 2A transmits the writing-back request to each node 2B. In STEP S93, each node 2B receives the writing-back request and replies whether to deny or accept. Here, for example, in the case where the flag of the restored-data D2 is newer than the flag that indicates the creation time of the divided-data stored in the node 2B, the node 2B responds to accept the request. When the flag of the restored-data D2 is not newer, the node 2B replies to deny the request.

Upon receiving the reply of acceptance from each node 2B, in the following STEP S94, the node 2A transmits the divided and changed restored-data D2-1 to D2-4 to each node 2B that stores corresponding divided-data D1-1 to D1-4, respectively.

In STEP S95, each node 2B receives the divided and changed restored-data that corresponds to each node, and write back each divided-data to be stored. Further, in STEP S96, an update process is also performed to the flag regarding the storage data.

The node 2A transmits the completion notice that notifies the end of the update process of the stored data to the node 2C, and then the writing-back process of the changed restored-data D2 ends. That is, the above-mentioned STEP S91 to STEP S97 function as a divided-information transmission process.

Figure 18:
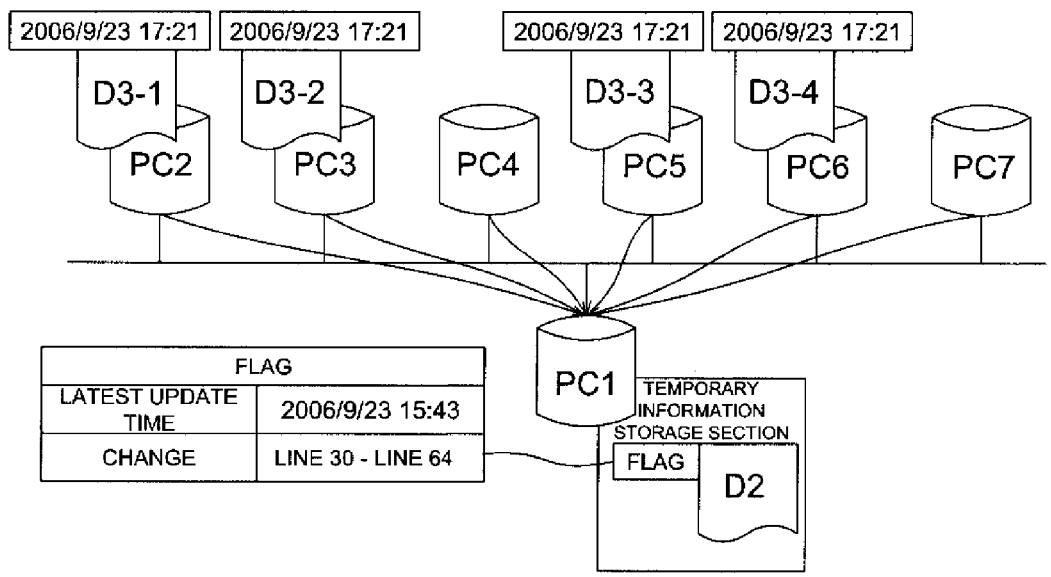
FIG. 18 illustrates a state in which the change of the restored-data cannot be reflected to the stored data as a special case of FIG. 17.

As a special case, FIG. 18 illustrates the state in which the change of the restored-data cannot be reflected to the divided storage data. Here, a state in which PC1 functioning as node 2C is transmitting a writing-back request to PC2 to PC7 and acquiring the responses is illustrated. In an ordinary case, PC1 replaces the divided-data D1-1 to D1-4 stored in PC2, PC3, PC5 and PC6 with the new divided-data D2-1 to D2-4 prepared from the restored-data D2, respectively.

However, in this case, the reply of refusal is coming from PC2, PC3, PC5 and PC6. The time of the divided-data stored in each PC last changed is newer than that of restored-data D2 changed by PC1. That is, the divided-data stored is already reflected to D3-1 to D3-4.

New data cannot be replaced by old data. In the information management method of this embodiment of the present invention, such incident does not usually occur. However, for example, such incident may occur in case where the power supply of PC1 briefly stops for a certain reason, and the restored-data of PC1 disappears from the network.

Even when PC1 is in such situation in which the writing-back is not possible, PC1 performs the already mentioned restored-data assigning process and ends the role of the temporary storage node. Alternatively, PC1 can take measures, such as to search for new restored-data and attempt to perform the restored-data changing process again.

In the case where the security is prioritized, when there is a trouble, such as stop of the power supply, the information discarding process mentioned below is unconditionally executed, and PC1 ends its role as the temporary storage node.

(Information Discarding Process)

When it was determined, from reference to the flag in STEP S20 of FIG. 7, to be the time for discarding the information, the information such as the restored-data and the flag is discarded in STEP 23 after a necessary process such as the restored-data writing-back process. Then the temporary storage node ends its role as the temporary storage node. That is, STEP S20 and STEP S23 of FIG. 7 function as the information discarding process.

The timing for discarding the information is controlled by the contents of the flag, but basically the information is discarded after a certain laps of time to avoid the risk of information leakage to a third party because of a long time of storage of the data.

FIG. 19 illustrates an example of the contents indicated by a flag. For example, the flag includes not less than one of the following contents. Then the information discarding timing is determined based on the not less than one content.

For example, it is the restoration time. The time when the restored-data is generated is recorded, and when a fixed period time lapses after the restoration, the information is discarded.

For example, it is the reference time. The time when the restored-data is last referenced is recorded, and when the restored-data is not referenced for a certain period after that time, the information is discarded.

FIG. 20 illustrates an example of updating the reference time of the flag.

FIG. 20 illustrates a state in which PC1 functioning as the node 2A searches PC2 to PC7 and acquires the restored-data D1 from PC7 being the temporary storage node of the restored-data. Here, the final access time in the flag is updated and replaced by the time when PC1 accessed the restored-data D1 of PC7.

The flag is thus updated every time the date is accessed. When the data is frequently accessed, the data is not discarded, and when a certain period of time has passed without access, the data is discarded.

Other than the above-mentioned, as an example of the contents of the flag, the timing for discarding the information can be set by estimating the frequency of use from the number of times of read-out and the number of times of write-in.

Further, from the security point of view, apart from the degree of use, it is effective to discard information based on data reference error, system error and other error occurred. It is preferable to discard the restored-data every time the power supply stops.

Of course, apart from the contents of the flag, it is possible to arbitrary discard the information held in the temporary information storage section 204a depending on an instruction of the administrator.

Thus, according to the information management method and the information processing device functioning as a node according to the embodiment of the present invention, the divided information which is distributed to and shared with a plurality of nodes on the network is collected, the restored-information is generated, and the restored-data is stored in the temporary information storage section in a state that the restored data is accessible from the other nodes. Thus, each node is able to efficiently use the restored-information. In addition, a flag that indicates the history of the information is provided. When the holding of the restored information is determined to be inappropriate based on the contents of the flag, the security against the information leakage is secured by immediately discarding the information.

The scope of the present invention is not limited to the above-mentioned embodiment. As far as it does not depart from the scope of the present invention, a modification of the embodiment is also included in the present invention.

The invention claimed is:

1. An information management method in a network system in which divided-information is distributed to and stored in a plurality of nodes, the method comprising:
  an information restoration step for causing a first node of the plurality of nodes to collect the divided-information and generate restored-information when no other node has the restored-information;
  an information acquiring step for acquiring the restored-information from one of the plurality of nodes when the node has the restored-information;
  a temporary storage step for storing the restored-information, generated in the information restoration step of the first node, in a temporary information storage section in the first node with a flag indicating a history of a process which was performed in the first node to the restored-information, the restored-information being transmitted by the first node to one or more nodes when the first node receives a request for restored-information, the one or more nodes being different from the first node and being among the plurality of nodes storing the divided-information;
  a restored-information modifying step for, when the restored-information is modified in the first node, causing the first node to modify the flag to indicate content of a modification which has been made to the restored-information and store the modified restored-information in the temporary storage section with the modified flag; and a restored-information obtaining step for causing the one or more nodes to access the first node and obtain the modified restored-information and the content of the modification, which are for generating the restored-information in the one or more nodes.

2. The information management method of claim 1, comprising:

an information discard step for causing the first node to reference the flag and discarding, based on a content of the flag, the restored-information which is stored in the temporary storage section in the temporary storage step.

3. The information management method of claim 2, wherein the content of the flag includes a time when the restored-information stored in the temporary storage section was generated, and the information discard step is executed when a predetermined period of time has passed since the restored-information was generated.

4. The information management method of claim 2, wherein the content of the flag includes a time when the restored-information stored in the temporary storage section was referenced, and the restored-information stored in the temporary storage section is discarded when a predetermined period of time has passed since the restored-information was last referenced.

5. The information management method of claim 1, comprising:

a restored-information obtaining step for causing the second node to access the first node and obtain the restored-information.

6. The information management method of claim 1, comprising:

a divided-information transmission step for causing the first node to divide the restored-information modified in the restored-information modifying step to be corresponding to the divided-information and transmit corresponding newly divided information to each node storing the divided-information which was divided before restored.

7. The information management method of claim 6, comprising:

an information discard step for causing the first node to reference the flag and discarding, based on a content of the flag, the restored-information which was stored in the temporary storage section in the temporary storage step, wherein when the restored-information has been modified in the restored-information modifying step, the divided-information transmission step is executed before the information discard step is executed.

8. An information processing device as a node in a network system in which divided-information is distributed to and stored in a plurality of nodes, the information processing device comprising:

a processor; and
a non-transitory storage media;
said processor being configured to collect the divided-information and generate restored-information when no other node has the restored-information;
said processor being further configured to acquire the restored-information from one of the plurality of nodes when the node has the restored-information;

said non-transitory storage media storing the restored-information generated by said processor of the first node with a flag indicating a history of a process which was performed in the information processing device to the restored-information, the restored-information being transmitted by the first node to one or more nodes when the first node receives a request for restored information, the one or more nodes being different from the first node and being among the plurality of nodes storing the divided-information;

said processor being further configured for modifying the restored-information and the flag stored in said non-transitory storage media such that the modified flag indicates content of a modification which has been made to the restored-information; and storing the modified restored-information and modified flag in said non-transitory storage media; and said processor being further configured for obtaining the modified restored-information and the content of the modification which are for generating the restored-information.

9. The information processing device of claim 8, comprising:

said processor referencing the flag and discarding the restored-information stored in said non-transitory storage media based on a content of the flag.

10. The information processing device of claim 9, wherein the content of the flag includes a time when the restored-information stored in said non-transitory storage media was generated, and said processor discards the restored-information stored in said non-transitory storage media when a predetermined period of time has passed since the restored-information was generated.

11. The information management device of claim 9, wherein the content of the flag includes a time when the restored-information stored in said non-transitory storage media was last referenced, and the information discarding is executed when a predetermined period of time has passed since the restored-information was last referenced.

12. The information processing device of claim 8, comprising:

said processor searching the other nodes for restored-information stored in the other node,
wherein when the node storing the restored-information is found, said processor accesses the found node and obtains the restored-information from the found node.

13. The information processing device of claim 8, comprising:

said processor dividing the restored-information modified by said processor to be corresponding to the divided-information and transmitting each of the newly divided restored-information to each node so that the divided-information is replaced by each of the corresponding newly divided information.

14. The information processing device of claim 13, comprising:

said processor referencing the flag and discarding the restored-information stored in said non-transitory storage media based on the content of the flag,
wherein when the restored-information has been modified by said processor, said processor transmits the divided-information before said processor discards the restored-information.

* * * * *